United States Patent
Yamashita et al.

(10) Patent No.: US 7,426,090 B2
(45) Date of Patent: Sep. 16, 2008

(54) STORAGE DEVICE, CONTROL DEVICE, CONTROL METHOD, AND PROGRAM

(75) Inventors: Satoshi Yamashita, Kawasaki (JP); Shunji Saitou, Higashine (JP); Yukio Abe, Kawasaki (JP); Shigenori Yanagi, Kawasaki (JP)

(73) Assignee: Fujitsu, Limited, Kawasaki (JP)

( * ) Notice: Subject to any disclaimer, the term of this patent is extended or adjusted under 35 U.S.C. 154(b) by 18 days.

(21) Appl. No.: 11/522,684

(22) Filed: Sep. 18, 2006

(65) Prior Publication Data

US 2007/0230014 A1   Oct. 4, 2007

(30) Foreign Application Priority Data

Mar. 28, 2006   (JP) .............. 2006-088677

(51) Int. Cl.
*G11B 21/02*   (2006.01)
(52) U.S. Cl. ...................................... 360/75
(58) Field of Classification Search ............ 360/75, 360/69, 126, 128, 294.7, 125, 122, 119, 59, 360/234.5
See application file for complete search history.

(56) References Cited

U.S. PATENT DOCUMENTS

| | | | |
|---|---|---|---|
| 4,777,544 A | | 10/1988 | Brown et al. |
| 5,410,439 A | | 4/1995 | Egber et al. |
| 5,991,113 A | * | 11/1999 | Meyer et al. ............... 360/75 |
| 6,437,930 B1 | | 8/2002 | Liu et al. |
| 6,952,330 B1 | * | 10/2005 | Riddering et al. ........ 360/294.7 |
| 7,190,543 B2 | * | 3/2007 | Suk ............................... 360/69 |
| 7,239,471 B2 | * | 7/2007 | Tanabe ......................... 360/75 |
| 2005/0046982 A1 | | 3/2005 | Liu et al. |
| 2005/0094316 A1 | | 5/2005 | Shiramatsu et al. |
| 2006/0002001 A1 | | 1/2006 | Fong et al. |
| 2007/0030593 A1 | * | 2/2007 | Hiroyuki et al. ............ 360/118 |
| 2007/0268624 A1 | * | 11/2007 | Lou et al. .................... 360/126 |

FOREIGN PATENT DOCUMENTS

| | | |
|---|---|---|
| EP | 0 326 756 | 8/1989 |
| EP | 1 677 290 A2 | 7/2006 |
| JP | 2002-037480 | 5/2002 |
| JP | 2005-071546 | 3/2005 |
| JP | 2005-276284 | 10/2005 |

* cited by examiner

*Primary Examiner*—Fred Tzeng
(74) *Attorney, Agent, or Firm*—Greer, Burns & Crain, Ltd.

(57) ABSTRACT

A heater for changing a projection distance protrusion value by thermal expansion accompanying electric-power-distributed heating is embedded in a head having a reading element and a recording element. A clearance control information measurement unit measures and saves, at desired correction timing, clearance control information including a clearance required for controlling the clearance between the reading element and the recording medium, heater projection sensitivity protrusion sensitivity, projection distance protrusion value transition time, recording current projection distance protrusion value, and a temperature correction coefficient. The clearance control unit varies the electric power distributed to the heater and changes the projection distance protrusion value of the head, thereby controlling the clearance to a target clearance upon reproduction and recording.

18 Claims, 29 Drawing Sheets

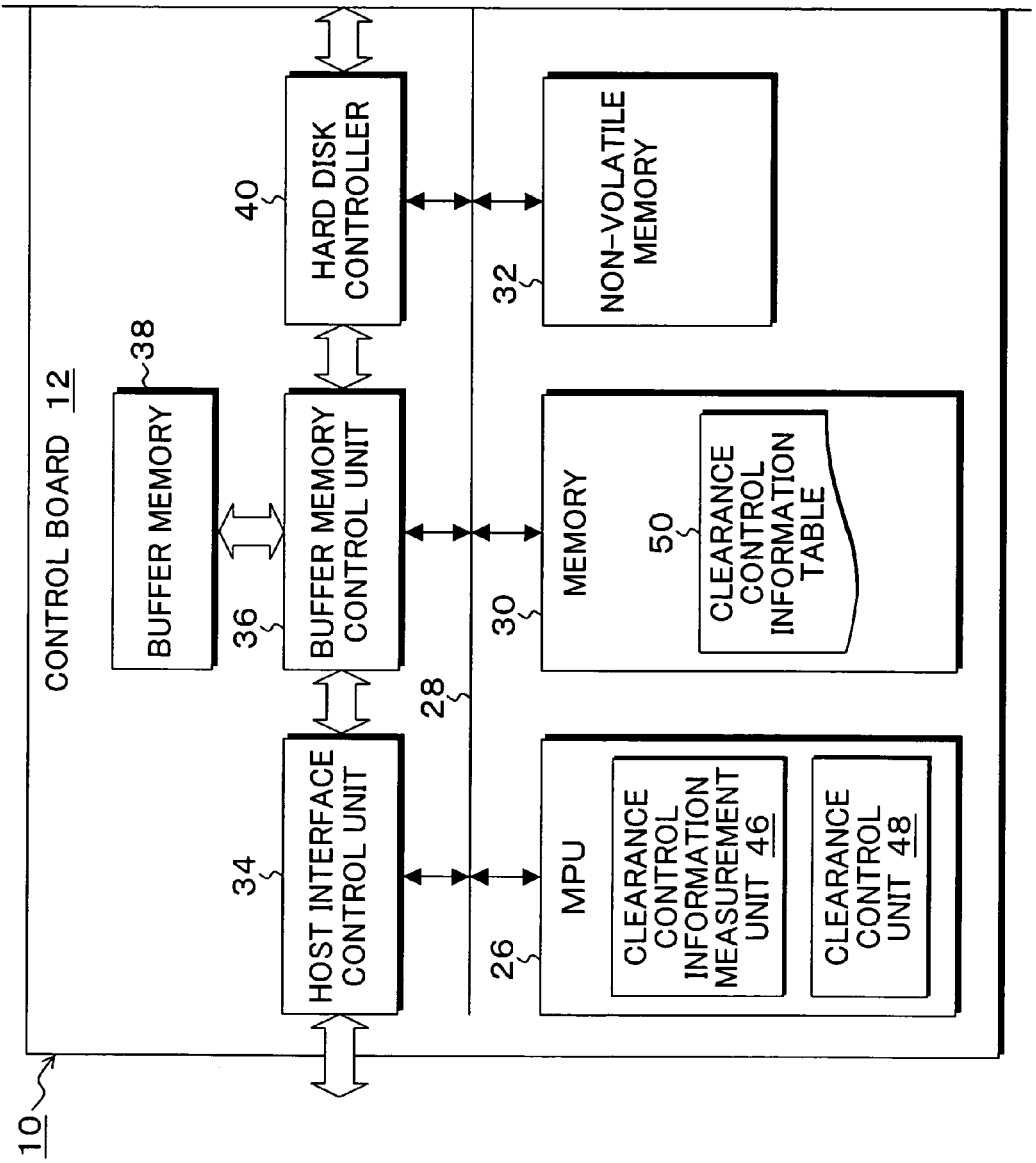

FIG. 5

| ZONE No. 92 | CLEARANCE [nm] 94 | TARGET CLEARANCE [nm] 96 | HEATER PROJECTION SENSITIVITY [nm/w] 98 | PROJECTION TRANSITION TIME [sec] 100 | RECORDING CURRENT PROJECTION DISTANCE [nm] 102 | PROJECTION SENSITIVITY TEMPERATURE CORRECTION COEFFICIENT 104 | CLEARANCE TEMPERATURE CORRECTION COEFFICIENT 106 |
|---|---|---|---|---|---|---|---|
| Z1 | do1 | dp | e1 | tp1 | dw1 | Ke1 | Kd1 |
| Z2 | do2 | dp | e2 | tp2 | dw2 | Ke2 | Kd2 |
| Z3 | do3 | dp | e3 | tp3 | dw3 | Ke3 | Kd3 |
| Z4 | do4 | dp | e4 | tp4 | dw4 | Ke4 | Kd4 |
| Z5 | do5 | dp | e5 | tp5 | dw5 | Ke5 | Kd5 |
| Z6 | do6 | dp | e6 | tp6 | dw6 | Ke6 | Kd6 |
| Z7 | do7 | dp | e7 | tp7 | dw7 | Ke7 | Kd7 |
| Z8 | do8 | dp | e8 | tp8 | dw8 | Ke8 | Kd8 |
| Z9 | do9 | dp | e9 | tp9 | dw9 | Ke9 | Kd9 |
| Z10 | do10 | dp | e10 | tp10 | dw10 | Ke10 | Kd10 |

50

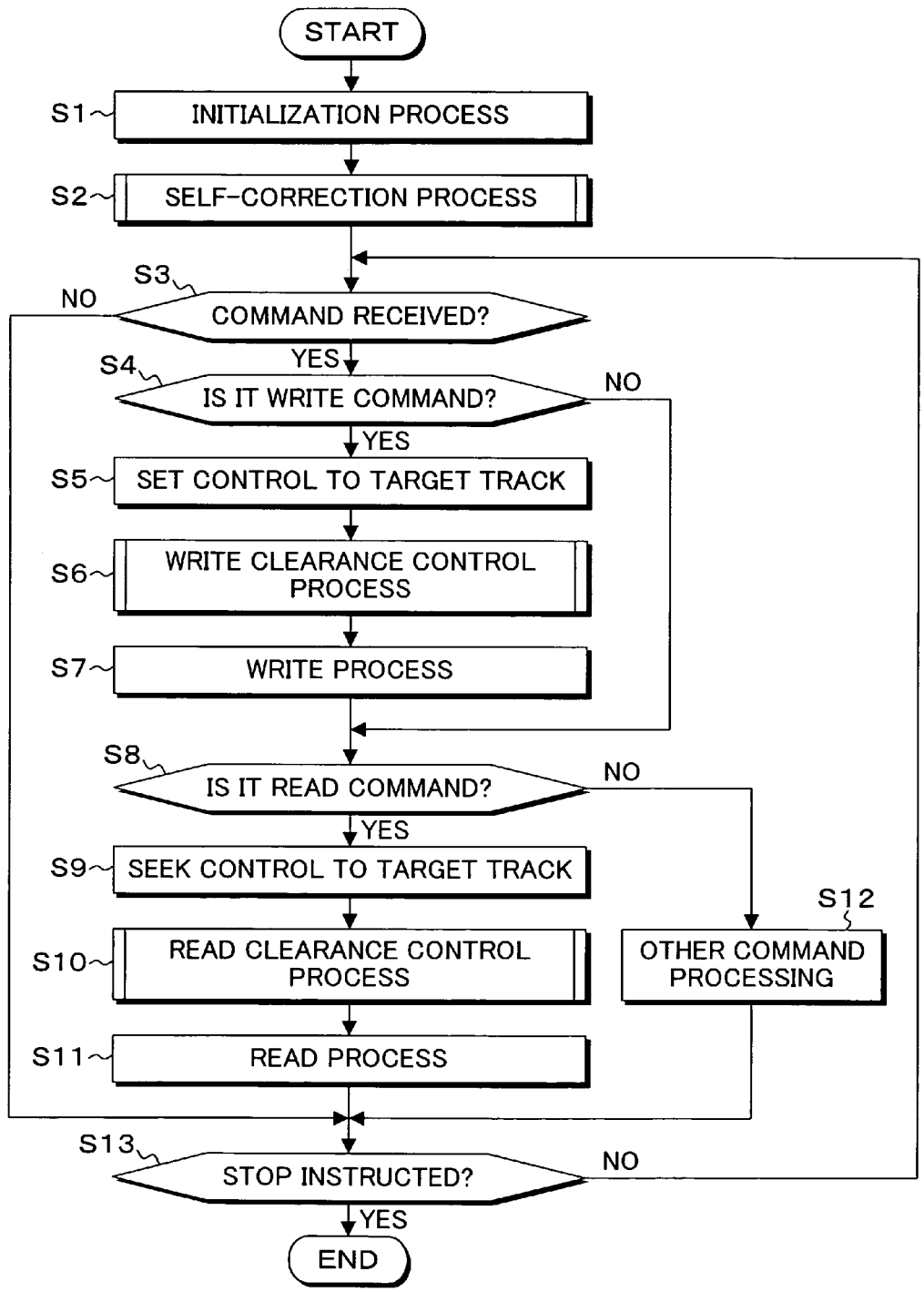

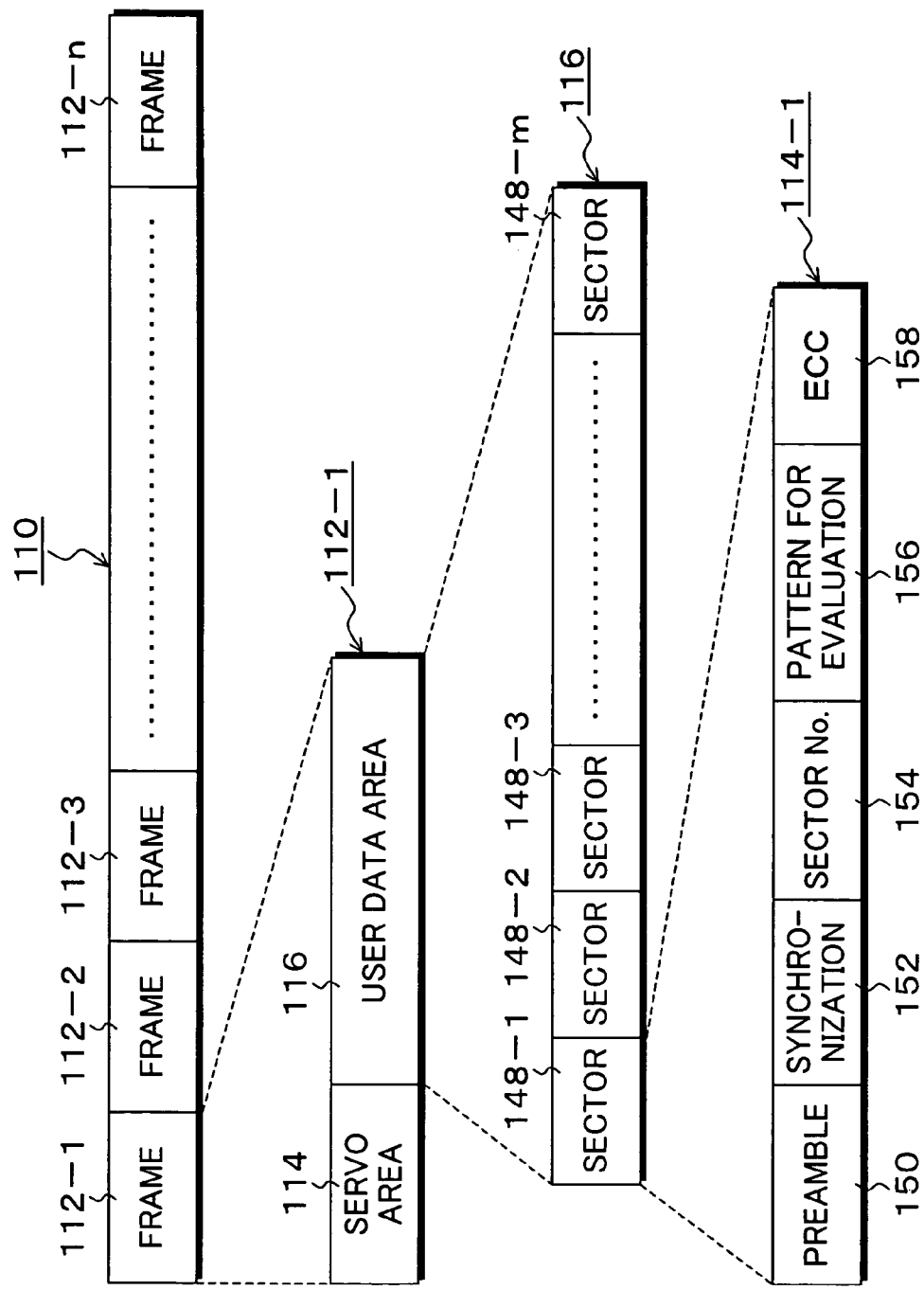

FIG. 17A HEATER CONTROL
FIG. 17B READ SIGNAL AMPLITUDE
FIG. 17C CLEARANCE CHANGED DISTANCE

STORAGE DEVICE, CONTROL DEVICE, CONTROL METHOD, AND PROGRAM

This application is a priority based on prior application No. JP 2006-088677, filed Mar. 28, 2006, in Japan.

BACKGROUND OF THE INVENTION

1. Field of the Invention

The present invention relates to a storage device for reading/writing data by floating a head with a flying head above a rotating recording medium, and particularly relates to a storage device, a control method, and a program for controlling the clearance between the head and the recording medium, the head-disk clearance to a predetermined target clearance by changing the projection distance protrusion value by thermal expansion accompanying heating of a heater provided in a head caused by electric power distribution.

2. Description of the Related Arts

Conventionally, the floating distance flying height of the head with respect to the recording surface of a magnetic disk has to be reduced in order to realize a high recording density of the magnetic disk device, and a floating distance flying height of 10 nm order is realized recently. However, when the floating distance flying height of the head is reduced, collision with minute protrusions on the magnetic disk surface is readily generated, and variation of the clearances between heads is present in the range of mechanical common differences; therefore, there is a problem that the floating distance flying height cannot be set lower than the range of common differences when the medium contact is taken into consideration. Therefore, recently, like JP2002-037480, there is proposed a method in which variation in the projection distance protrusion value (TPR distance) caused by a phenomenon in which the head floating surface protrudes toward the direction of the magnetic disk due to temperature increase in a write head (thermal protrusion: TPR) is measured in an examination process or the like and retained in a magnetic disk, and the data is used for managing the floating distance flying height for each head. Furthermore, there have also been proposed methods like JP2005-071546 and JP2005-276284 in which a heater is incorporated in a head, and the clearance between the head and the recording surface of a magnetic disk is controlled by utilizing the projection phenomenon caused by thermal expansion of the head floating surface accompanying electric power distribution to the heater. In JP2005-071546, a constant element temperature is maintained by changing the electric power applied to an electricity conduction film provided on the head with respect to increase in the device temperature or the element temperature due to recording/reproduction, thereby maintaining a constant clearance between the element and the recording medium. In JP2005-276284, a heating device for floating distance flying height increase, for increasing the distance between the recording reproduction element and the magnetic disk surface, by causing a part of an air bearing surface of the head to expand and project by heating, and a heating device for reduction in the floating distance flying height for reducing the distance between the recording/reproduction element and the magnetic disk surface by causing another part of the head air bearing surface to expand and project by heating are provided in the head, and the floating distance flying height is corrected such that reproduction can be performed without causing collision during device activation or the like. Moreover, as the method for measuring the changed distance of the clearance between the head of the magnetic disk device and the magnetic disk, a method utilizing the fact that reproduction amplitude lead from the space loss method of Wallace spacing loss is changed in accordance with the clearance is known (U.S. Pat. No. 4,777,544)

However, in such conventional methods of controlling the clearance between the head and the magnetic disk recording surface, basically, the projection distance protrusion value is adjusted such that reproduction can be performed without causing medium contact by utilizing that the clearance is changed due to expansion/projection of the head floating surface along with heating of the heater caused by electric power distribution; and there has been a problem that highly precise clearance control of controlling the clearance upon recording and reproduction to a constant target clearance by taking variation of the clearances which are different in each head into consideration cannot be performed. Moreover, in the conventional clearance measurement utilizing the space loss method of Wallace spacing loss (Wallace), the clearance is measured from amplitude change in a reproduction signal when the head is caused to float by activating the magnetic disk device in the state in which the head is in contact and stopped in a contact-start-stop area of the magnetic disk surface. However, in recent magnetic disk devices, contact-start-stop of the head is abolished, and a head retained in a ramp load mechanism is delivered to the disk surface upon activation of the device in the state in which the magnetic disk is rotating, thereby causing it to float from the beginning; thus, there is a problem that the amplitude change at the time when the head which is in contact with the magnetic disk surface floats cannot be detected, and the clearance cannot be measured from unchanged amplitude of the reproduction signal of the head which is floating with a constant clearance.

SUMMARY OF THE INVENTION

According to the present invention to provide a storage device, a control method, and a program which can precisely measure the clearance between a head in a floating state and a recording medium surface and perform highly precise control such that a target clearance is achieved upon recording and reading by controlling the amount of electric power distribution to a heater which is provided in a head.

(Device)

The present invention provides a storage device. The storage device of the present invention is characterized by having a head having a reading element and a recording element and an embedded heater for changing a projection distance protrusion value by thermal expansion accompanying electric-power-distributed heating for reading/writing data by floating above a rotating recording medium;

a clearance information measurement unit for measuring clearance information required for controlling a clearance between the reading element and the recording medium upon desired correction; and a clearance control unit for controlling the clearance upon reproduction and recording by changing the projection distance protrusion value of the head by varying the electric power distributed to the heater.

The recording medium is divided into a plurality of zones in a radial direction, and the clearance information measurement unit measures the clearance information for each of the zones and saves the information in a system area of the recording medium or a non-volatile memory of the device.

The clearance information measurement unit has a clearance measurement unit for measuring a clearance do at a reference temperature, a projection sensitivity protrusion sensitivity measurement unit for measuring heater projection sensitivity protrusion sensitivity e, which is a head projection distance protrusion value per unit electric power distributed to the heater at the reference temperature, a transition time measurement unit for measuring projection transition time tp from distribution of electric power to the heater until projection deformation of the head is completed, a recording current projection distance protrusion value measurement unit for measuring a recording current projection distance protrusion value dw of the head when a recording current is caused to flow through the recording head at the reference temperature, a first temperature correction coefficient measurement unit for measuring a first temperature correction coefficient Kd for correcting the clearance do and the recording current projection distance protrusion value dw measured at the reference temperature to values at a temperature in clearance control, and a second temperature correction coefficient measurement unit for measuring a second temperature correction coefficient Ke for correcting the heater projection sensitivity protrusion sensitivity e measured at the reference temperature to a value at the temperature in clearance control.

The clearance measurement unit measures a clearance changed distance while increasing the electric power distributed to the heater, determines that the head is in contact with the recording medium when a derivative value of the clearance changed distance is below a predetermined threshold value, and employs the clearance changed distance at the point of the determination as a measurement result of the clearance.

The clearance measurement unit measures the clearance for each track and writes it to a clearance information area provided in a servo area of each frame of the measurement track.

The clearance measurement unit may measure amplitude of a read signal from a preamble part in a servo area in each frame of the recording medium by the reading head while increasing the electric power distributed to the heater, determine that the head is in contact with the recording medium when a derivative value of the amplitude with respect to the heater electric power is below a predetermined threshold value, and calculate the clearance from the amplitude at the point of the determination.

The clearance measurement unit has an amplitude detection unit for detecting amplitude of a read signal from a preamble part in a servo area of each frame of the recording medium by the reading head in a state in which the head is positioned to an arbitrary measurement objective track, an initial amplitude retaining unit for retaining initial amplitude Vo detected by the amplitude detection unit before electric power is distributed to the heater, a measured amplitude retaining unit for retaining measured amplitude Vi detected by the amplitude detection unit upon measurement when electric power is distributed to the heater, and a calculating unit for calculating the clearance changed distance d as $$d = \frac{\lambda}{2\pi} \log\left(\frac{Vi}{Vo}\right)$$

based on a recording wavelength λbf the preamble part, the initial amplitude Vo, and the measured amplitude Vi.

The amplitude detection unit detects the amplitude of the read signal from an automatic gain control signal with respect to a variable gain amplifier for amplifying the read signal obtained from the reading element.

The clearance measurement unit has a pattern reading unit for positioning the head to a predetermined measurement-dedicated track in which a repeated pattern of a predetermined frequency is recorded in a user data area of the recording medium and modulating the read signal of the repeated pattern;

an amplitude detection unit for detecting basic frequency amplitude V(f) and third harmonic wave amplitude V(3f) of the read signal;

an initial amplitude retaining unit for retaining the basic frequency amplitude Vo(f) and the third harmonic wave amplitude Vo(3f) detected by the amplitude detection unit before electric power is distributed to the heater;

an initial amplitude ratio calculating unit for calculating an initial amplitude ratio Ro of the basic frequency and the third harmonic wave retained in the initial amplitude retaining unit as $$Ro = \log\frac{Vo(f)}{Vo(3f)};$$

a measured amplitude retaining unit for retaining basic frequency amplitude Vi(f) and third harmonic wave amplitude Vi(3f) detected by the amplitude detection unit upon measurement when electric power is distributed to the heater;

a measured amplitude ratio calculating unit for calculating a measured amplitude ratio Ri of the basic frequency and the third harmonic wave retained in the measured amplitude retaining unit as $$Ri = \log\frac{Vi(f)}{Vi(3f)}; \text{ and}$$

a calculating unit for calculating the clearance changed distance d as $$d = \frac{v(Ri - Ro)}{2\pi(3f - f)},$$

based on a linear speed v of the track for measurement, the initial amplitude ratio Ro, and the measured amplitude ratio Ri.

In the track for measurement, a repeated pattern having a recording wavelength that is 10 to 20 times the basic recording length of user data is recorded in the user data area of each frame.

The projection sensitivity protrusion sensitivity measurement unit calculates the heater projection sensitivity protrusion sensitivity e as a value obtained by dividing the clearance measured by the clearance measurement unit by the electric power distributed to the heater at the time when collision is determined.

The projection transition time measurement unit obtains the mean amplitude of preamble read signals of servo areas by repeating the electric power distribution to the heater over a range of a predetermined number of frames in the state in which the head is positioned to an arbitrary measurement objective track and detects time from start of the electric power distribution to the heater until the amplitude change is stabilized as the projection transition time tp.

The projection transition time measurement unit detects, as the projection transition time tp, time which is 10% to 90% of the amplitude change from start of the electric power distribution to the heater until the amplitude change is stabilized.

The projection transition time measurement unit detects the detected projection transition time tp by converting the time into a number of frames.

The projection transition time measurement unit obtains mean amplitude of preamble read signals from servo areas while writing a random pattern having a predetermined recording density to user data areas by the recording head over a range of a predetermined number of frames in a state in which the head is positioned to an arbitrary measurement objective track, and detects the recording current projection distance protrusion value dw by calculating a clearance changed distance from the mean amplitude.

The projection transition time measurement unit calculates the clearance changed distance d as $$d = \frac{\lambda}{2\pi} \log\left(\frac{Vai}{Vo}\right),$$

based on a recording wavelength $\lambda$ of the preamble part, the initial amplitude Vo before power distribution to the heater, and the mean amplitude Vai and sets it as a recording current projection distance protrusion value dw.

The clearance control unit has a write clearance control unit for controlling the electric power distribution to the heater upon a write to the recording medium by the recording element such that the clearance is a predetermined write target clearance, and a read clearance control unit for controlling the electric power distribution to the heater upon a read from the recording medium by the reading element such that the clearance is a predetermined read target clearance.

The write clearance control unit has a clearance information obtaining unit for obtaining a clearance do, a write target clearance dp, a recording current projection distance protrusion value dw, heater projection sensitivity protrusion sensitivity e, projection transition time tp, a first temperature correction coefficient Kd and a second temperature correction coefficient Ke corresponding to a target record track from a system area of the recording medium;

a preheat control unit for preliminary heating the heater by distributing preheat electric power to the heater form a frame position which is before the projection transition time tp with respect to a target frame in which a target sector is present; and a write heat control unit for switching the preheat electric power to write heat electric power for control to the target clearance when arriving at the target frame and stopping heater electric power distribution at a next frame position after recording is finished.

The clearance information obtaining unit obtains the clearance do from a clearance information area in a servo area of a frame which is before the projection transition time tp with respect to the target frame.

When a temperature differential between a reference temperature and a device temperature is $\Delta T$, the preheat control unit subjects the clearance do, the recording current projection distance protrusion value dw, and the heater projection sensitivity protrusion sensitivity e to temperature correction:

$do = do' + Kd \cdot \Delta T$ $dw = dw' + Kd \cdot \Delta T$ $e = e' + Ke \cdot \Delta T,$ (wherein values denoted by ' is before correction), and then, calculates and distributes the preheat electric power Pp as $$Pp = \frac{do - dp}{e}; \text{ and}$$

the preheat control unit calculates and distributes the write heat electric power Pw as $$Pw = \frac{do - dp - dw}{e}.$$

The read clearance control unit has a clearance information obtaining unit for obtaining a clearance do, a read target clearance dp, heater projection sensitivity protrusion sensitivity e, projection transition time tp, a first temperature compensation coefficient Kd, and a second temperature correction coefficient Ke corresponding to a target reading track from a system area of the recording medium or the device memory; and a read heat control unit for heating the heater by distributing read heat electric power to the heater from a frame position which is before the projection transition time tp with respect to a target frame and stopping electric power distribution to the heater at a next frame position after read is finished.

The clearance information obtaining unit obtains the clearance do from the clearance information area in the servo area of the frame which is before the projection transition time tp with respect to the target frame.

When the temperature differential between the reference temperature and the device temperature is $\Delta T$, the read heat control unit subjects the clearance do and the heater projection sensitivity protrusion sensitivity e to temperature correction as $do = do' + Kd \cdot \Delta T$ $e = e' + Ke \cdot \Delta T,$ and then, calculates and distributes read heat electric power Pr as $$Pr = \frac{do - dp}{e}.$$

(Method)

The present invention provides a control method of a storage device. The present invention is a control method of a storage device having a head having a reading element and a recording element and an embedded heater for changing a projection distance protrusion value by thermal expansion accompanying electric-power-distributed heating for reading/writing data by floating above a rotating recording medium, the method is characterized by having a clearance information measurement step of measuring clearance information required for controlling a clearance between the reading element and the recording medium upon desired correction; and a clearance control step of controlling the clearance to a predetermined target clearance upon reproduction and recording by changing the projection distance protrusion value of the head by varying the electric power distributed to the heater.

(Program)

The present invention provides a program executed by a computer of a storage device. The program of the present invention is characterized by causing a computer of a storage device having a head having a reading element and a recording element and an embedded heater for changing a projection distance protrusion value by thermal expansion accompanying electric-power-distributed heating for reading/writing data by floating above a rotating recording medium to execute a clearance information measurement step for measuring clearance information required for controlling a clearance between the reading element and the recording medium upon desired correction; and a clearance control step of controlling the clearance to a predetermined target clearance upon reproduction and recording by changing the projection distance protrusion value of the head by varying the electric power distributed to the heater.

(Control Device)

The present invention provides a control device (MPU). The present invention is a control device of a storage device having a head having at least either one of a reading element and a recording element and provided with a heater for changing a projection distance protrusion value by thermal expansion accompanying electric-power-distributed heating for accessing data by floating above a rotating recording medium, wherein the control device is characterized by having a clearance information measurement unit for measuring clearance information required for controlling a clearance between the reading element and the recording medium upon desired correction; and a clearance control unit for controlling the clearance to a predetermined target clearance upon reproduction or recording by changing the projection distance protrusion value of the head by varying the amount of electric power distributed to the heater. According to the present invention, for example in an examination process or the like, regarding the clearance of a head, precisely, the clearance between the reading element and the recording medium surface, a clearance changed distance is measured while the head is caused to expand and project by increasing the amount of electric power distributed to the heater, contact of the head projected part with the medium or a state immediately before that is determined when a value obtained by differentiating the clearance changed distance is reduced to equal to or less than a threshold value, and the clearance changed distance at that point is set as a clearance measured value of the head; thus, the clearance can be accurately measured for a floating head. Moreover, in addition to the measurement of the clearance do of the head, the recording current projection distance protrusion value dw, the heater projection sensitivity protrusion sensitivity e, the projection transition time tp, the first temperature correction coefficient Kd, and the second temperature correction coefficient Ke are measured as the clearance control information required for clearance control; thus, highly precise clearance control is realized such that control is performed by use of the parameters such that the write target clearance is achieved at the write target sector upon recording and the read target clearance is achieved at the read target sector upon reading. When the clearance of the head is controlled to a constant target clearance in this manner, a uniform recording/reproduction characteristic can be obtained even when heads in which variation is generated in the floating distance flying height are used, and head deterioration due to medium contact can be avoided; as a result, the head yield is improved and the cost can be reduced. The above and other objects, features, and advantages of the present invention will become more apparent from the following detailed description with reference to the drawings.

BRIEF DESCRIPTION OF THE DRAWINGS

FIGS. 1A and 1B are block diagrams of a magnetic dick device showing an embodiment of a storage device according to the present invention;

FIG. 5 is an explanatory diagram of a clearance control information table used in the present embodiment;

FIG. 6 is a flow chart of an overall processing operation of the present embodiment;

FIG. 15 is an explanatory diagram of measurement-dedicated track used in the HRF method;

DETAILED DESCRIPTION OF THE PREFERRED EMBODIMENTS

Figure 1B:
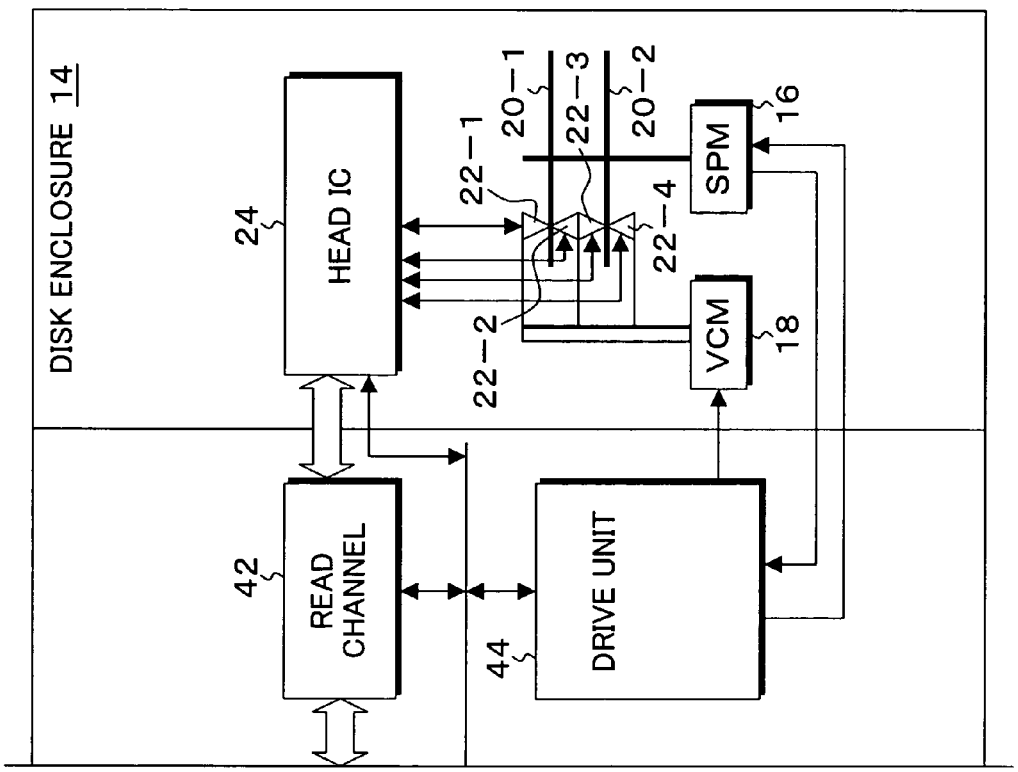

FIGS. 1A and 1B are block diagrams showing an embodiment of a magnetic disk device according to the present invention. In FIGS. 1A and 1B, the magnetic disk device 10 which is known as a hard disk drive (HDD) is comprised of a disk enclosure 14 and a control board 12. A spindle motor (SPM) 16 is provided in the disk enclosure 14; and magnetic disks (storage media) 20-1 and 20-2 are attached to a rotating shaft of the spindle motor 16 and rotated at, for example, 4200 rpm for a certain period of time. In addition, a voice coil motor (VCM) 18 is provided in the disk enclosure 14, wherein the voice coil motor 18 has distal ends of arms of head actuators on which heads 22-1 to 22-4 are loaded so as to perform positioning of the heads with respect to recording surfaces of the magnetic disks 20-1 and 20-2. In addition, recording elements and reading elements are loaded on the heads 22-1 to 22-4 in an integrated manner.

The heads 22-1 to 22-4 are connected to a head IC 24 by signal lines, and the head IC 24 selects one of the heads according to a head select signal based on a write command or a read command from a host which serves as an upper-level device so as to perform a write or a read. Moreover, in the head IC 24, a write amplifier is provided for a write system, and a pre-amplifier is provided for a read system. An MPU 26 is provided in the control board 12, and, with respect to a bus 28 of the MPU 26, a memory 30 using a RAM for storing a control program and control data and a non-volatile memory 32 using an FROM or the like for storing a control program are provided. In addition, with respect to the bus 28 of the MPU 26, a host interface control unit 34, a buffer memory control unit 36 for controlling a buffer memory 38, a hard disk controller 40, a read channel 42 which functions as a write modulation unit and a read modulation unit, a drive unit 44 for controlling the voice coil motor 18 and the spindle motor 16.

The magnetic disk device 10 performs writing processes and reading processes based on commands from the host. Herein, normal operations in the magnetic disk device will be described below. When a write command and write data from the host are received by the host interface control unit 34, the write command is decoded by the MPU 26, and the received write data is stored in the buffer memory 38 in accordance with needs. Then, it is converted into a predetermined data format by the hard disk controller 40, an ECC code is added thereto by ECC processing, and scrambling, RLL code conversion, and write compensation are performed in the write modulation system in the read channel 42. Then, it is written to a magnetic disk 20 from the write amplifier via the head IC 24 and from the recording element of, for example, the selected head 22-1. In this course, the MPU 26 gives a head positioning signal to the drive unit 44 having a VCM motor driver, etc., and, after a target track which is specified by the command is sought, the head is caused to be placed on the track by the voice coil motor 18 so as to perform track following control.

Meanwhile, when a read command from the host is received by the host interface control unit 34, the read command is decoded by the MPU 26, read signals read by the reading element of the head 22-1 of the head IC 24 which is selected by head selection are amplified by the pre-amplifier. Then, they are input to the read modulation system of the read channel 42, read data is modulated by partial response maximum likelihood detection (PRML) or the like, and errors are detected and corrected by performing ECC processing by the hard disk controller 40. Then, they are subjected to buffering to the buffer memory 38, and the read data is transferred to the host from the host interface control unit 34.

As functions realized in the MPU 26 by executing programs, a clearance control information measurement unit 46 and a clearance control unit 48 are provided. The heads 22-1 to 22-4 of the present embodiment have the reading elements and the recording elements and are provided with heaters for changing projection distance protrusion values by thermal expansion accompanying heating caused by electric power distribution. For example in an examination process in a plant, the clearance control information measurement unit 46 measures clearance information which is required for controlling clearances between respective reading elements and the magnetic disks 20-1 to 20-2 for each of the heads 22-1 to 22-4 at the timing of a self-correction process when the magnetic disk device 10 is activated and records that to system areas of the magnetic disks 20-1, 20-2 or the non-volatile memory of the device. The clearance control information measured by the clearance control information measurement unit 46 includes the following.

(1) Clearance do at a reference temperature
(2) Heater projection sensitivity protrusion sensitivity e which is a head projection distance protrusion value per unit electric power distributed to the heater at the reference temperature
(3) Projection transition time tp from electric power is distributed to the heater until projection deformation of the head is completed
(4) Recording current projection Distance protrusion value dw of the head when a recording current flows through the recording element at the reference temperature
(5) Clearance temperature correction coefficient (first temperature correction coefficient) Kd for correcting the clearance do and the recording current projection distance protrusion value dw measured at the reference temperature to values at a temperature at the time when the clearance is controlled
(6) Projection sensitivity protrusion sensitivity temperature correction coefficient (second temperature correction coefficient) Ke for correcting the heater projection sensitivity protrusion sensitivity e measured at the reference temperature to a value at the time when the clearance is controlled.

The clearance control unit 48 varies the electric power distributed to the heater provided in the head, thereby controlling the clearance to a target clearance upon reproduction and recording. In order to execute the clearance control upon recording or reproduction, when a write command or a read command is received from the host and decoded, a clearance control information table 50 deployed from a system area to the read memory 30 is referenced, and clearance control information corresponding to the target track is obtained.

Figure 2:
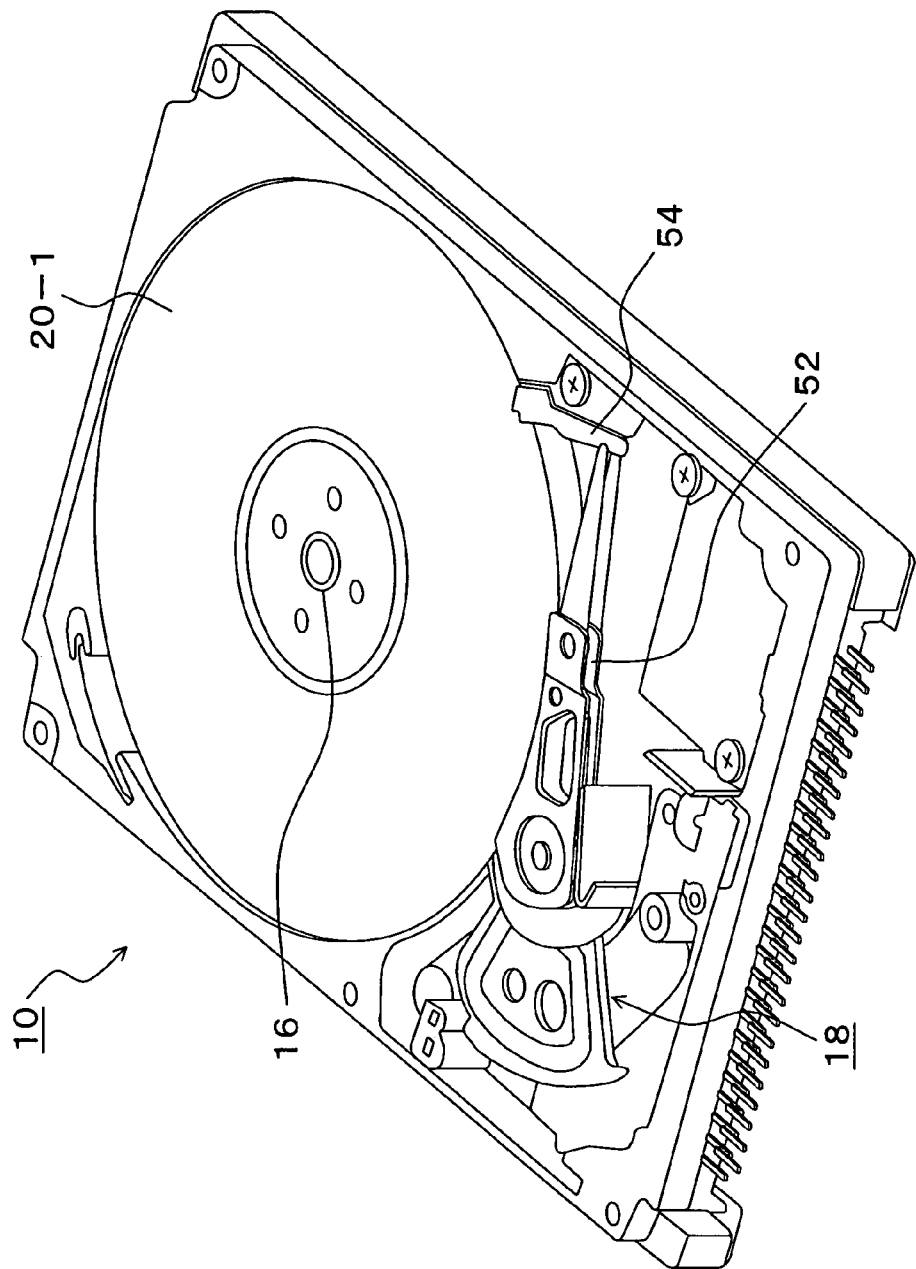
FIG. 2 is an explanatory diagram of a mechanical structure of the magnetic disk device according to the present embodiment.

FIG. 2 shows an inner structure of the disk enclosure 14 in the magnetic disk device 10 of FIGS. 1A and 1B. In FIG. 2, in the magnetic disk device 10, the magnetic disks 20-1 and 20-2 rotated by the spindle motor 16 are incorporated, head actuators 52 which are driven by the voice coil motor 18 with respect to the magnetic disks 20-1 and 20-2 are provided, and the heads are attached to the distal ends of the head actuators 52. The head actuators 52 are at retracted positions in the state shown in the drawing, and, at this point, the head parts at the distal ends of the head actuators 52 are retracted on a ramp mechanism 54 which is disposed toward the head thrown-out direction with respect to the magnetic disks 20-1 and 20-2. When electric power of the magnetic disk device is turned on, the magnetic disks 20-1 and 20-2 are rotated by the spindle motor 16, and, when the number of rotations reaches a constant number of rotations, the head actuators 52 are turned by the voice coil motor 18 to the side of the magnetic disks 20-1 and 20-2, thereby throwing out the heads from the ramp mechanism 54 onto the magnetic disks 20-1 and 20-1.

Figure 3A:
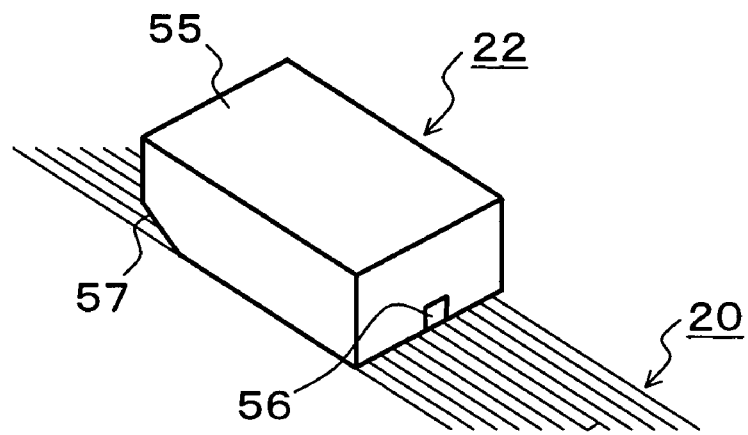
FIGS. 3A and 3B are explanatory drawings of a head structure of the present embodiment.
Figure 3B:
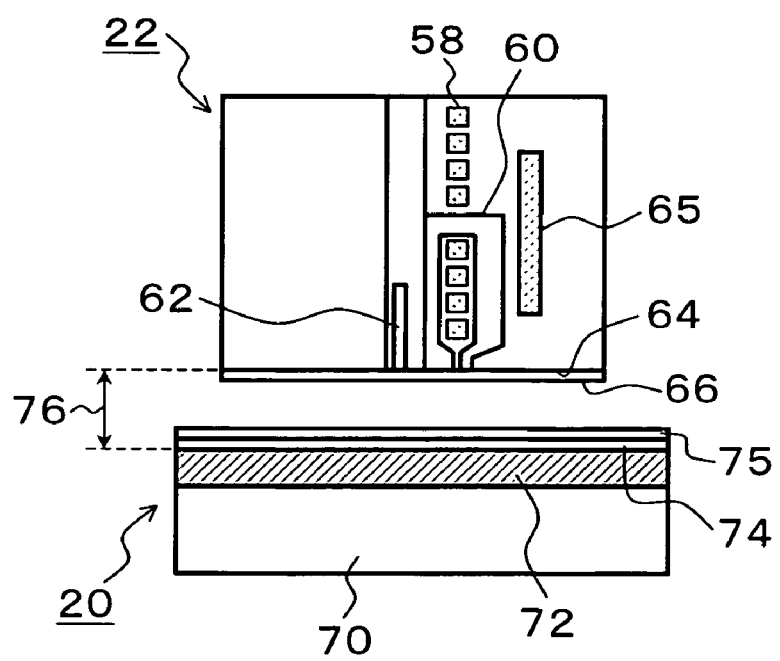

FIGS. 3A and 3B show explanatory drawings of a head structure of the present embodiment. FIG. 3A focuses on a head 22 which is used in the present embodiment, wherein a reading element and a recording element are formed on an end face of a slider 55 which is made of, for example, a ceramic material. A tapered surface 57 is formed in the distal end side of the floating surface of the slider 55 which is opposed to the magnetic disk 20, and an air communication groove 56 is formed on the floating surface in the track direction.

FIG. 3B is a cross sectional view wherein the head 22 is viewed in the track direction. A recording coil 58 and a recording core 60 are provided as the recording element in the head 22 which is made of ceramic or the like. A reading element 62 is provided in the left side of the recording element such that it is adjacent thereto. As the reading element 62, a GMR element (Giant Magneto Resistance element) or a TMR element (Tunneling Magneto Resistance element) is used. The surface of the head 22 opposed to the magnetic disk 20 is an ABS surface (Air Bearing Surface) 64, and a protective film 66 is formed on the surface thereof. On the other hand, in the magnetic disk 20, a recording film 72 is formed on a substrate 70, a protective film 74 is formed subsequent to the recording film 72, and a lubricant 75 is further provided on the surface. In the present embodiment, a heater 65 is provided such that it is close to the recording core 60 which constitutes the recording element of the head 22. When electric power is distributed to the heater 65 so as to carry out heating, the ABS surface 64 serving as the floating surface of the head 22 expands and projects toward the side of the magnetic disk 20. A clearance 76 between the head 22 and the magnetic disk 20 is defined as a distance from the lower end of the reading element 62 to the recording film 72 of the magnetic disk 20.

Figure 4:
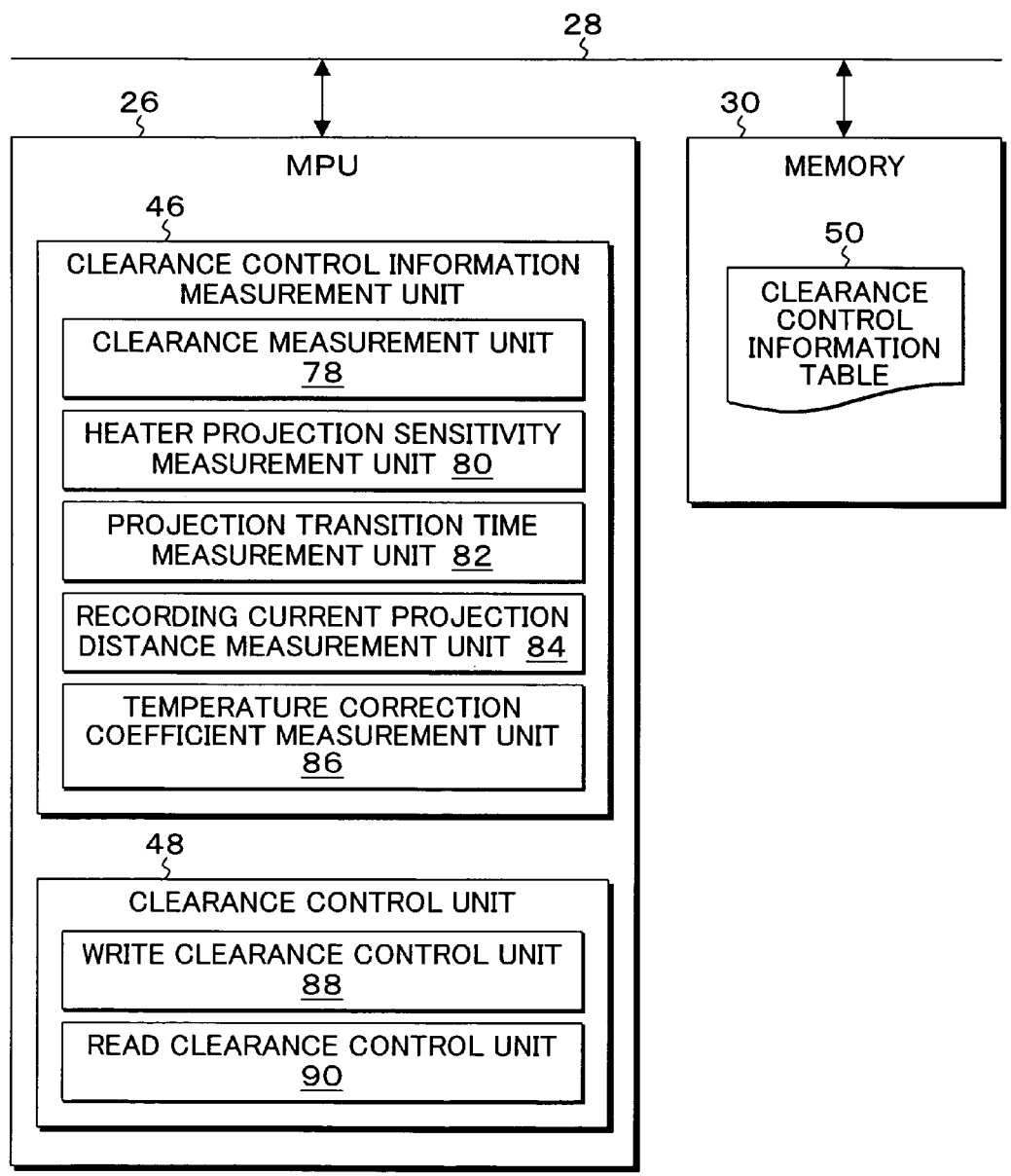
FIG. 4 is a block diagram showing details of a functional configuration of an MPU in the present embodiment.

FIG. 4 is a block diagram showing details of a functional configuration of the MPU 26 in the present embodiment. In FIG. 4, a clearance measurement unit 78, a heater projection sensitivity protrusion sensitivity measurement unit 80, a projection transition time measurement unit 82, a recording current projection distance protrusion value measurement unit 84, and a temperature correction coefficient measurement unit 86 are provided in the clearance control information measurement unit 46 by a firmware program of the MPU 26; and, when electric power distribution to the heater 65 of the head 22 of FIG. 3B is controlled, the control parameters described in above described (1) to (6) which are required for controlling the clearance 76 between the head 22 and the magnetic disk 20 to a predetermined target clearance are measured.

In the clearance control unit 48, a write clearance control unit 88 and a read clearance control unit 90 are provided. The write clearance control unit 88 controls the electric power distribution to the heater provided in the head such that the clearance between the head and the magnetic disk becomes a predetermined write target clearance upon a write to the magnetic disk performed by the recording element of the head. The read clearance control unit 90 controls electric power distribution to the heater provided in the head such that the clearance between the head and the magnetic disk becomes a predetermined read target clearance upon a read of the magnetic disk performed by the reading element of the head. Herein, the write target clearance which is a control target in the write clearance control unit 88 and the read target clearance which is a control target in the read clearance control unit 90 may be the same target clearance or different target clearances respectively for the recording element and the reading element.

The control parameters required for control of the clearance control unit 48 are recorded in the system area of the magnetic disk, are read out from the system area to the memory 30 upon activation of the magnetic disk device, and deployed as the clearance control information table 50; and, upon recording or reading during operation, the control parameters required for clearance control can be obtained by referencing the clearance control information table 50 of the memory.

FIG. 5 is an explanatory diagram of the clearance control information table 50 which is used in the present embodiment. In FIG. 5, the clearance control information table 50 has items of a zone number 92, a clearance 94, a target clearance 96, a heater projection sensitivity protrusion sensitivity 98, projection transition time 100, a recording current projection distance protrusion value 102, a projection sensitivity protrusion sensitivity temperature correction coefficient 104, and a clearance temperature correction coefficient 106.

In the present embodiment, the magnetic disk is divided into, for example, about 10 to 20 zones in the radial direction, and the clearance control information is measured and managed for each of the zones. In the example of FIG. 5, the magnetic disk is divided into 10 zones of Z1 to Z10 shown as the zone number 92 so as to carry out measurement management. The clearance 94 stores clearances do1 to do10 measured upon positioning of the head with respect to particular measurement objective tracks in the zones Z1 to Z10. The target clearance 96 stores, in this example, a read target clearance dp which is common to all the zones. The heater projection sensitivity protrusion sensitivity 98 is a head projection distance protrusion value per unit distributed electric power of the heater, which is calculated from the value of the clearance 94 upon measurement. In this example, heater projection sensitivities e1 to e10 are stored respectively for the zones Z1 to Z10. The projection transition time 100 is the time from electric power is distributed to the heater until heater projection is completed, and projection transition time tp1 to tp10 is stored respectively for the zones Z1 to Z10. The recording current projection distance protrusion value 102 is a head projection distance protrusion value when a writing current is caused to flow through the recording element, and recording current projection distance protrusion values dw1 to ds10 are stored respectively for the zones Z1 to Z10. Regarding the projection sensitivity protrusion sensitivity temperature correction coefficient 104, the clearance 94, the heater projection sensitivity protrusion sensitivity 98, and the recording current projection distance protrusion value 102 are values measured at a reference temperature, for example, a room temperature of 20° C. in an examination process in a plant, and the device temperature upon recording or reproduction during actual operation of the magnetic disk device is different from the reference temperature; therefore, correction based on the difference in the temperatures between the device temperature and the reference temperature is required. The projection sensitivity protrusion sensitivity temperature correction coefficient 104 performs correction of the device temperature with respect to the reference temperature of the heater projection sensitivity protrusion sensitivity 98. In this example, as the projection sensitivity protrusion sensitivity temperature correction coefficient 104, temperature correction coefficients Ke1 to Ke10 are stored respectively for the zones Z1 to Z10. Since the target clearance 96 and the recording current projection distance protrusion value 102 are values measured at a reference temperature, for example, a room temperature of 20° C. in a plant examination process which is different from the device temperature during operation, temperature correction therefor is performed; therefore, temperature correction coefficient Kd1 to Kd10 are stored respectively for the zones Z1 to Z10. In the clearance control information table 50 of FIG. 5, the unique clearances do1 to do10 measured for respectively for the zones Z1 to Z10 have to be stored for the clearance 94; however, the heater projection sensitivity protrusion sensitivity 98, the projection transition time 100, the recording current projection distance protrusion value 102, the projection sensitivity protrusion sensitivity temperature correction coefficient 104, and the clearance temperature correction coefficient 106 are not required to be obtained respectively for the zones Z1 to Z10 but may be values of the magnetic disk unit which are common to the zones Z1 to Z10.

FIG. 6 is a flow chart of an overall processing operation in the magnetic disk device of the present embodiment. In FIG. 6, when the electric power of the magnetic disk device is turned on, an initialization process is performed in step S1, and a self-correction process is executed in step S2. The measurement process of the clearance control information is executed as one processing item of the self-correction process.

Subsequently, command reception from the host is checked in step S3, and, when a command is received, the process proceeds to step S4 in which whether it is a write command or not is determined. If it is a write command, seek control to a target track based on command decoding is performed in step S5. Subsequently, in step S6, a write clearance control process is executed in an on-track state in which the head is positioned to the target track, and a write process is executed in step S7 in a state in which the clearance of the recording element with respect to the magnetic disk is controlled to a target clearance. If it is not a write command in step S4, whether it is a read command or not is determined in step S8; and, if it is a read command, after seek control to a target control according to command decoding is performed in step S9, a read clearance control process of step S10 is executed in a state in which the head is positioned to the target track. A read process of step S11 is executed in a state in which the reading element is controlled to a target clearance by the read clearance control process. If it is not a read command in step S8, another command processing is executed in step S12. Such processes of step S3 to S12 are repeated until there is a stop instruction of the device in S13.

Figure 7:
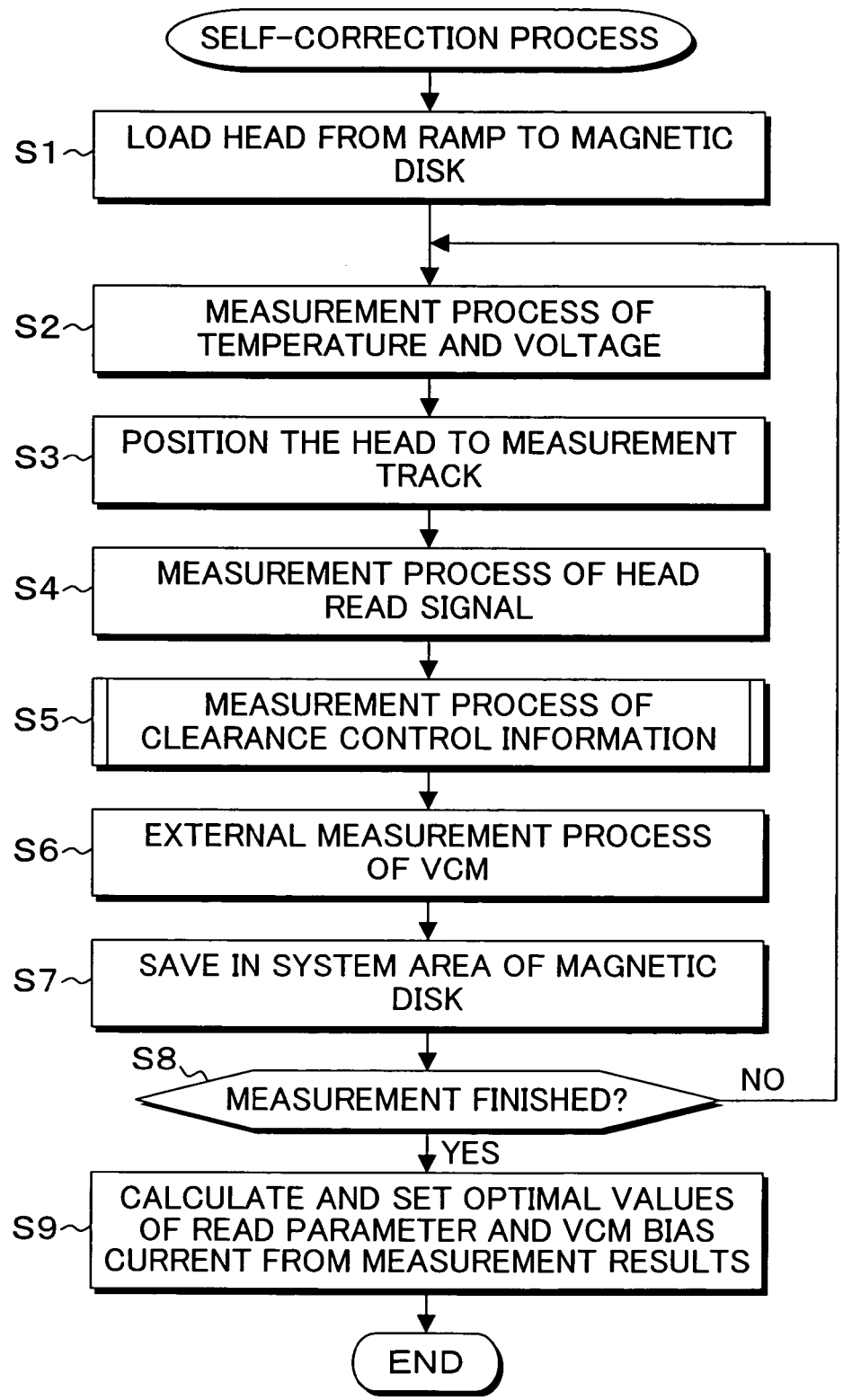
FIG. 7 is a flow chart showing details of the self correction process of step s2 of FIG. 6.

FIG. 7 is a flow chart showing details of the self correction process of step S2 of FIG. 6. In FIG. 7, in the self-correction process, as shown in FIG. 2, the head is loaded from the ramp mechanism 54 to the side of the magnetic disks 20-1 and 20-2 in step S1; and, subsequently in step S2, a measurement process of the temperature and voltage is performed. After the head is positioned to a predetermined measurement track in step S3, a measurement process of a head read signal is performed in step S4. Subsequently, a measurement process of clearance control information is executed in step s5. This measurement process of the clearance control information is performed for each zone of the magnetic disk.

Then, in step s6, an external force measurement process of the voice coil motor (VCM) 18 is performed. In the external force measurement process, a VCM bias current at each track position is measured while the head is moved from the inside to the outside by the VCM. Subsequently, in step S7, the measurement results obtained through the processes of step S2 to S6 are saved in the system area of the magnetic disk. Subsequently, in step S8, whether measurement is finished or not is checked; and, if it is not finished, the processes from step S2 are repeated. If the measurement is finished, in step S9, optimal values of read parameters and the VCM bias currents are calculated from the measurement results and set in a control table.

Figure 8:
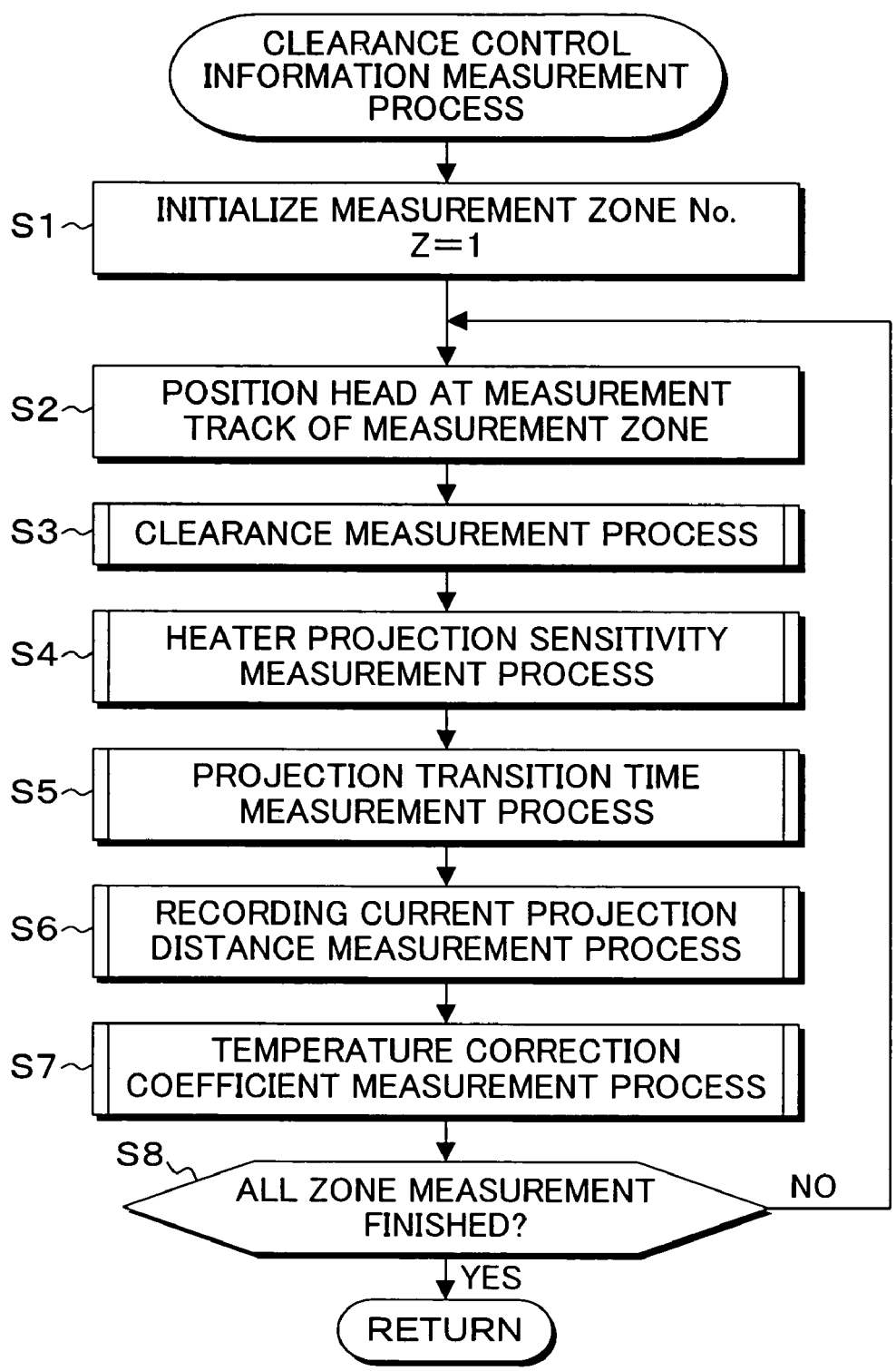
FIG. 8 is a flow chart showing details of the clearance control information measurement process of step s5 of FIG. 7.

FIG. 8 is a flow chart showing details of the clearance control information measurement process of step S5 of FIG. 7. In FIG. 8, after a measurement zone number Z is initialized to Z=1 in step S1, the head is positioned to a predetermined measurement track in the measurement zone in step S2. In this state, a clearance measurement process of step S3, a heater projections sensitivity measurement process of step S4, a projection transition time measurement process of step S5, a recording current projection distance protrusion value measurement process of step S6, and a temperature correction coefficient measurement process of step S7 are executed. The temperature correction coefficient measurement process of step S7 is required to be performed while the environmental temperature of the device is changed over a usage temperature range from a low temperature to a high temperature; therefore, it is not performed in the operation state after the magnetic disk device is shipped to a user but is performed merely in the examination process in the plant. Subsequently, whether measurement of all the zones is finished or not is checked in step S8; and, if it is not finished, the process returns to step S2 wherein the zone number is changed to the next zone Z2 and similar processes are repeated, and, when measurement of all the zones is finished in step S8 and a series of processes is finished, the process returns to step S6 of FIG. 7.

In the present embodiment, the measurement process of the clearance control information is executed as one of the self-correction processes performed when the electric power of the magnetic disk device is turned on, and the clearance control information measurement process is performed in an environmental state in which the device temperature in the examination process of the plant is the reference temperature. Therefore, the program, i.e., firmware for executing the flow chart of FIG. 8 of the measurement process of the clearance control information is installed into the magnetic disk device merely as firmware of the examination process, and the firmware of the clearance control information measurement process is deleted from the magnetic disk device when the measurement process is finished such that the clearance control information measurement process is not performed in the user operation state after plant shipment. As a matter of course, it may be shipped while the firmware of the clearance control information measurement process remains in the magnetic disk device, such that the clearance control information measurement process is executed in accordance with needs during user operation.

Figure 9:
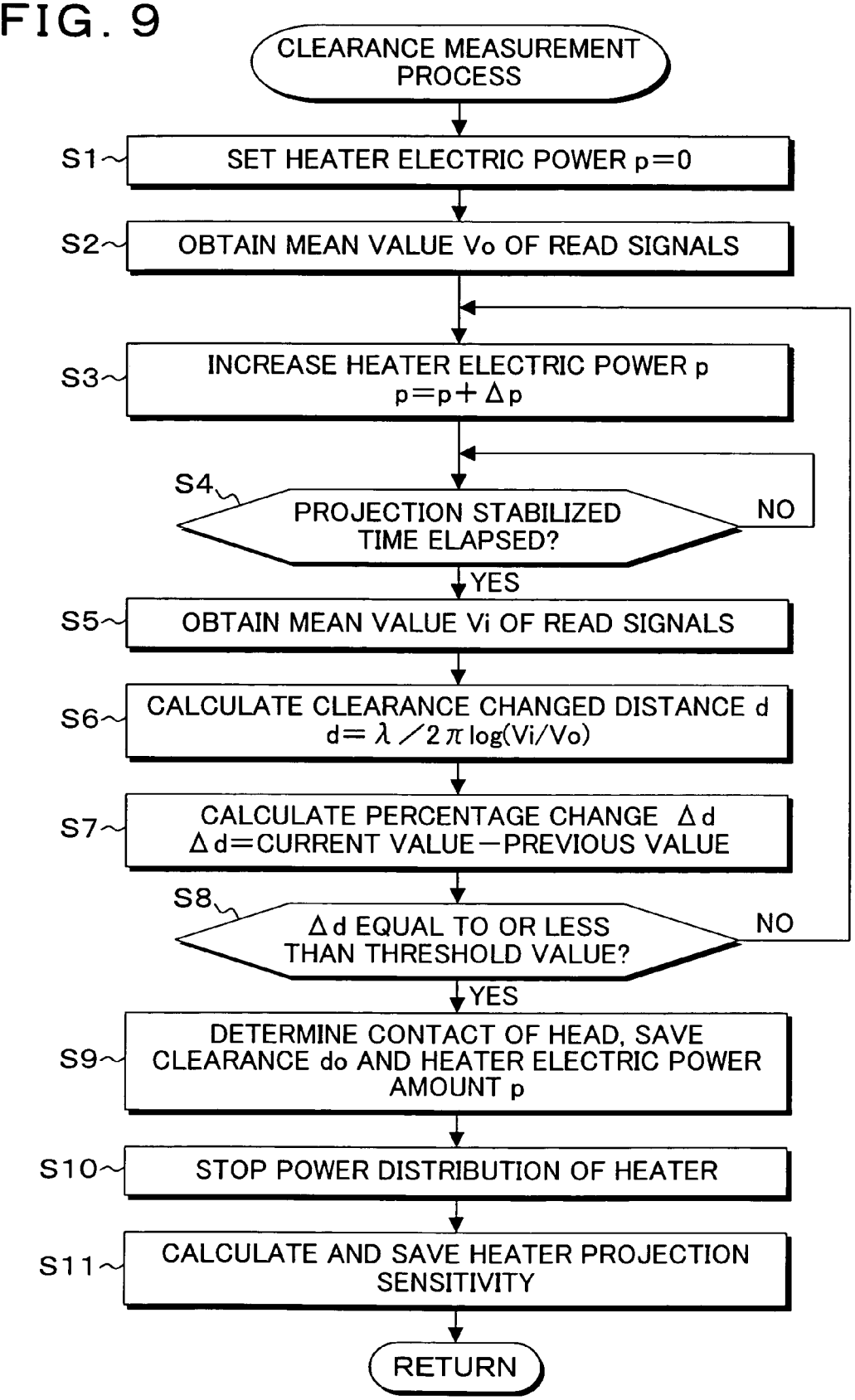
FIG. 9 is a flow chart showing details of the clearance measurement process of step s3 of FIG. 8 using the space loss method of Wallace spacing loss.

FIG. 9 is a flow chart showing details of the clearance measurement process of step S3 of FIG. 8 using the space loss method of Wallace spacing loss. In the clearance measurement using the space loss method of Wallace spacing loss in the present embodiment, since there is a correlation that when the clearance 76 which is the interval between the reading element 62 in the head 22 and the recording film 72 of the magnetic disk 20 in FIG. 3B is reduced in accordance with the head projection distance protrusion value based on heater electric power distribution, the amplitude of the read signal obtained from the reading element increases, the clearance changed distance corresponding to the head projection distance protrusion value accompanying the heater distribution is measured from the amplitude increase in the read signal. In FIG. 9, in the clearance measurement process, in a state in which the head is positioned to a predetermined measurement objective track in an arbitrary zone, heater electric power p is set to p=0, thereby attaining an electric power undistributed state, i.e., unheated state, and a mean value Vo of read signals is obtained in step S2. The target of the read signals upon the head clearance measurement are preamble signals recorded in servo areas of frames of the measurement objective track.

Figure 10:
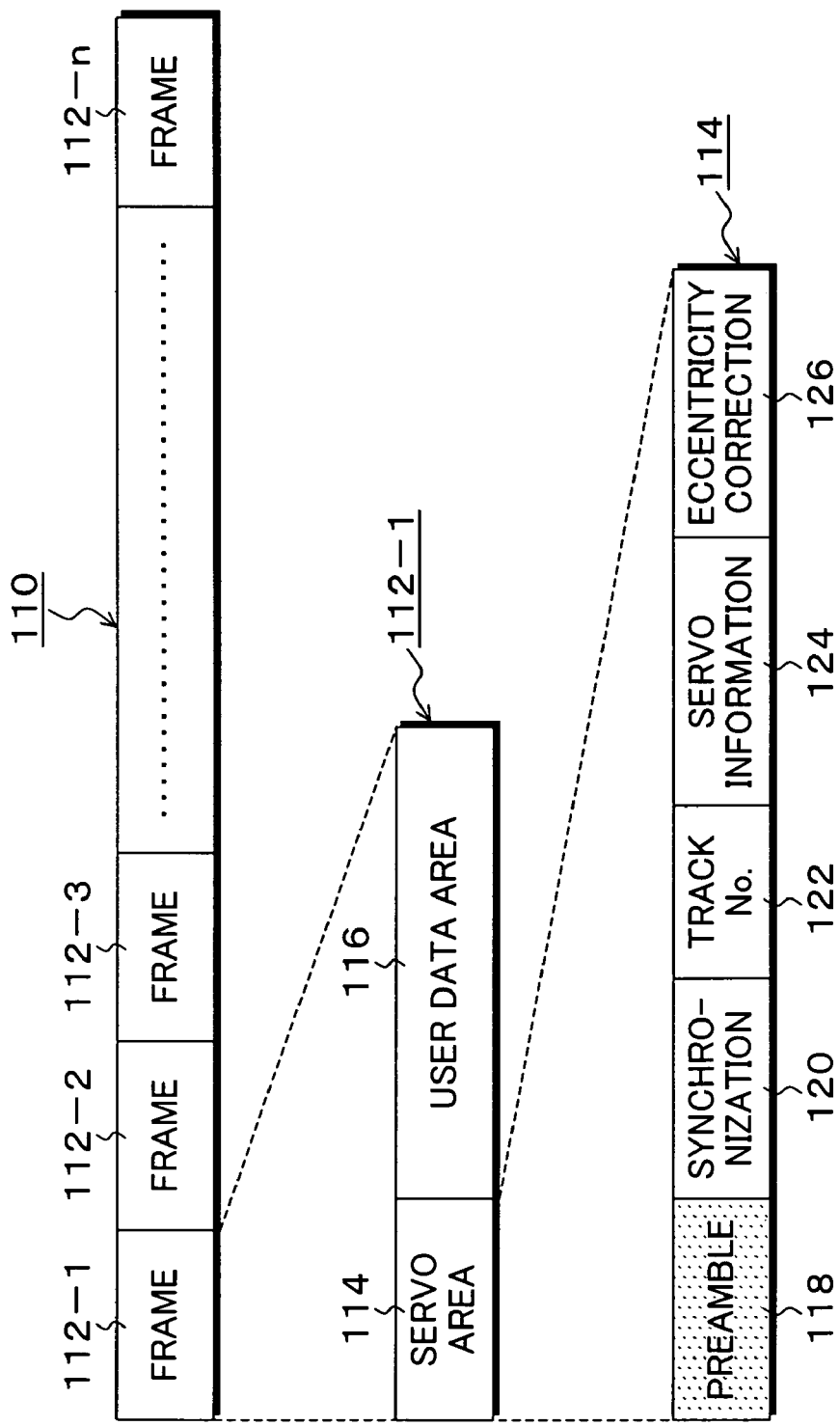
FIG. 10 is an explanatory diagram of measurement track for performing clearance measurement.

FIG. 10 is an explanatory diagram of the measurement objective track for performing the clearance measurement, wherein the track 110 is comprised of n units of frames 112-1 to 112-n. In order to simplify the explanation thereof, the frames are linearly illustrated. As shown in the enlarged manner in the lower side, the frame 112-1 is comprised of a servo area 114 and a user data area 116. As shown in the enlarged manner in the lower side, the servo area 114 is comprised of a preamble area 118, a synchronization area 120, a track number area 122, a servo information area 124, and an eccentricity correction area 126. Among these, in the preamble area 118, a repeated pattern of a predetermined frequency which is lower than a user data recording basic frequency is recorded, and this preamble pattern is read and the amplitude thereof is obtained.

Figure 11:
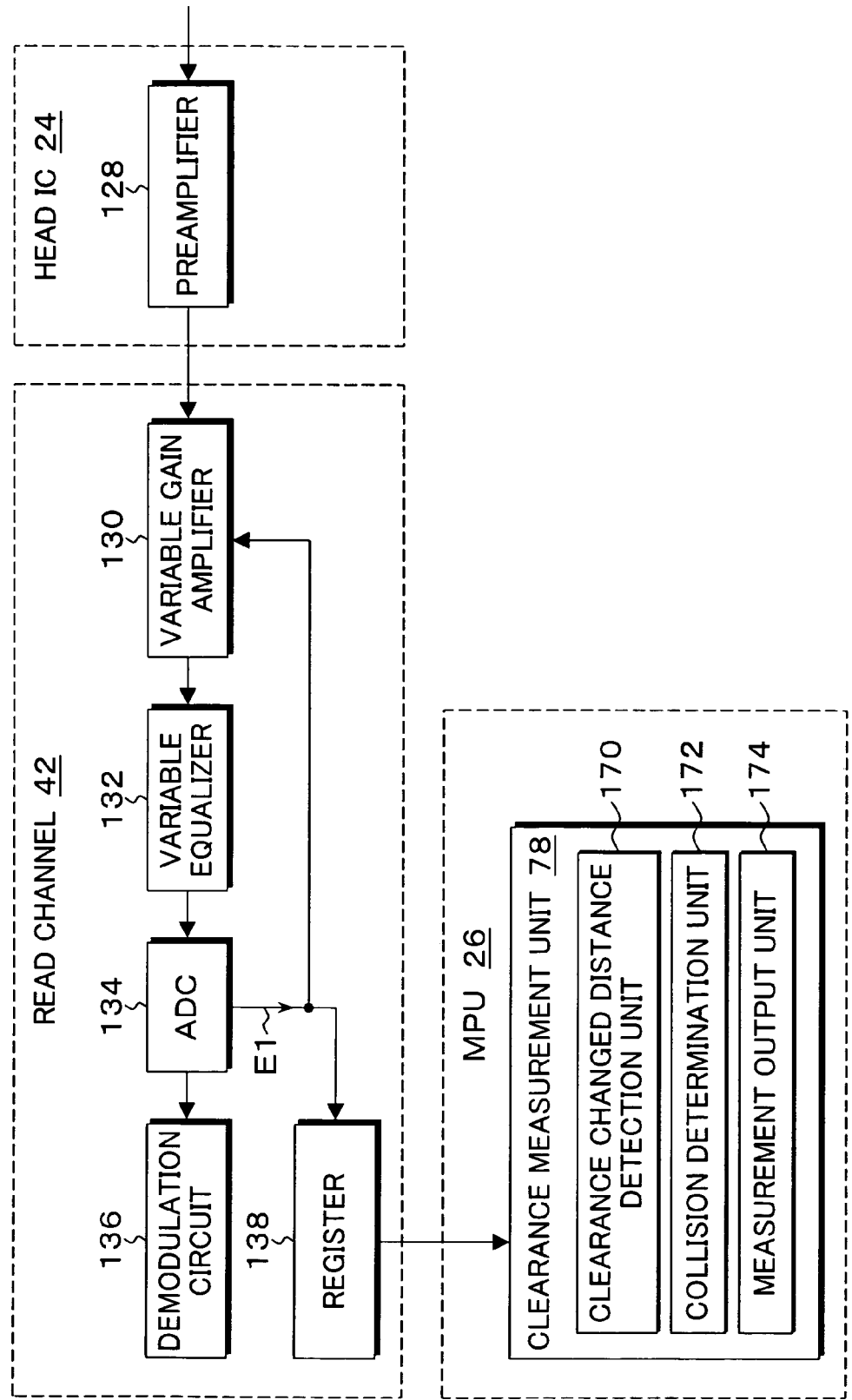
FIG. 11 is a block diagram of a circuit unit for detecting amplitudes of preamble read signals.

Measurement of the preamble read signal is specifically performed by use of the circuit unit of FIG. 11. FIG. 11 focuses on the read channel 42 and the head IC 24 in the magnetic disk device of FIGS. 1A and 1B. A preamplifier 128 for amplifying the read signal obtained from the reading element is provided in the head IC 24; an output signal from the preamplifier 128 is amplified in a variable gain amplifier (VGA) 130 of the read channel 42, then, equalized in a variable equalizer 132, and converted into digital data when it is subjected to sampling in an AD converter 134; and modulation of data and servo information is performed in a modulation circuit 136. In this course, an AGC control signal (automatic gain control signal) E1 which maintains constant amplifier output amplitude is fed from the AD converter 134 to the variable gain amplifier 130. In the present embodiment, an AGC signal E1 for the variable gain amplifier 130 is retained in a register 138, and, based on this, the MPU 26 calculates and obtains the amplitude of the head read signal from the AGC signal of the register 138. Referring again to step S2 of FIG. 9, in the state in which the heater electric power p is p=0, with respect to the preamble read signal read from the preamble area 118 of the servo area 114, a mean value Vo of the read signal is obtained as signal amplitude.

Subsequently, the heater electric power p is increased merely by a predetermined value Δp in step S3. Subsequently, elapse of projection stabilized time involved in the increase in the heater electric power is waited in step S4, and a mean value Vi of the read signal is obtained in step S5. Also in this case, the amplitude of the preamble signal is obtained from the AGC signal E1 of the register 138 shown in FIG. 11. Moreover, regarding the read signal, the mean value of the read signal corresponding to a plurality of frames is obtained. Subsequently, in step S6, a clearance changed distance do is calculated based on the space loss method of Wallace spacing loss. The clearance changed distance d can be provided by the following expression when the initial amplitude before electric power is distributed to the heater is Vo and the mean amplitude obtained through electric power distribution to the heater is Vi.

$$d = \frac{\lambda}{2\pi} \log\left(\frac{Vi}{Vo}\right) \quad (1)$$

Next, the process proceeds to step S7 wherein percentage change Δd of the calculated clearance changed distance d is calculated. As the percentage change Δd, a value is obtained by subtracting the previous value from the current value. As a matter of course, it may be a value obtained by differentiating the clearance changed distance d by the amount of heater electric power distribution. Next, whether the percentage change Δd is equal to or less than a predetermined threshold value or not is determined in step S8. If it is larger than the threshold value, the process returns to step S3 wherein the heater electric power is further increased merely by a predetermined value Δp, and the processes of step S4 to S7 are repeated. When the processes of above described step S3 to S8 are repeated, the electric power p with respect to the heater which is provided in the head is gradually increased by Δp at each time, the head projection distance protrusion value is also gradually increased in accordance with that, and, finally, a collided state in which the projecting part comes into contact with the recording film of the magnetic disk; and the collided state is determined by the threshold value.

More specifically, when the head projection distance protrusion value is increased in accordance with the increase in the heater electric power, and the projecting part comes into contact with the protective layer of the magnetic disk, it cannot be projected more than that and the percentage change is decreased; therefore, it is determined by the threshold value so as to determine the collision with the magnetic disk. Therefore, when the percentage change Δd is determined to be equal to or less than the threshold value in step S8, the process proceeds to step S9 wherein contact (collision) between the head and the magnetic disk is determined, and the clearance changed distance d and the heater electric power p at the time of the determination are saved. Subsequently, electric power distribution to the heater is stopped in step S10. Subsequently, in step S11, since the clearance d and the heater electric power p at the time are obtained in the clearance measurement process, the heater projection sensitivity protrusion sensitivity e is calculated and saved as $$e = d/p. \quad (2)$$

Figure 12:
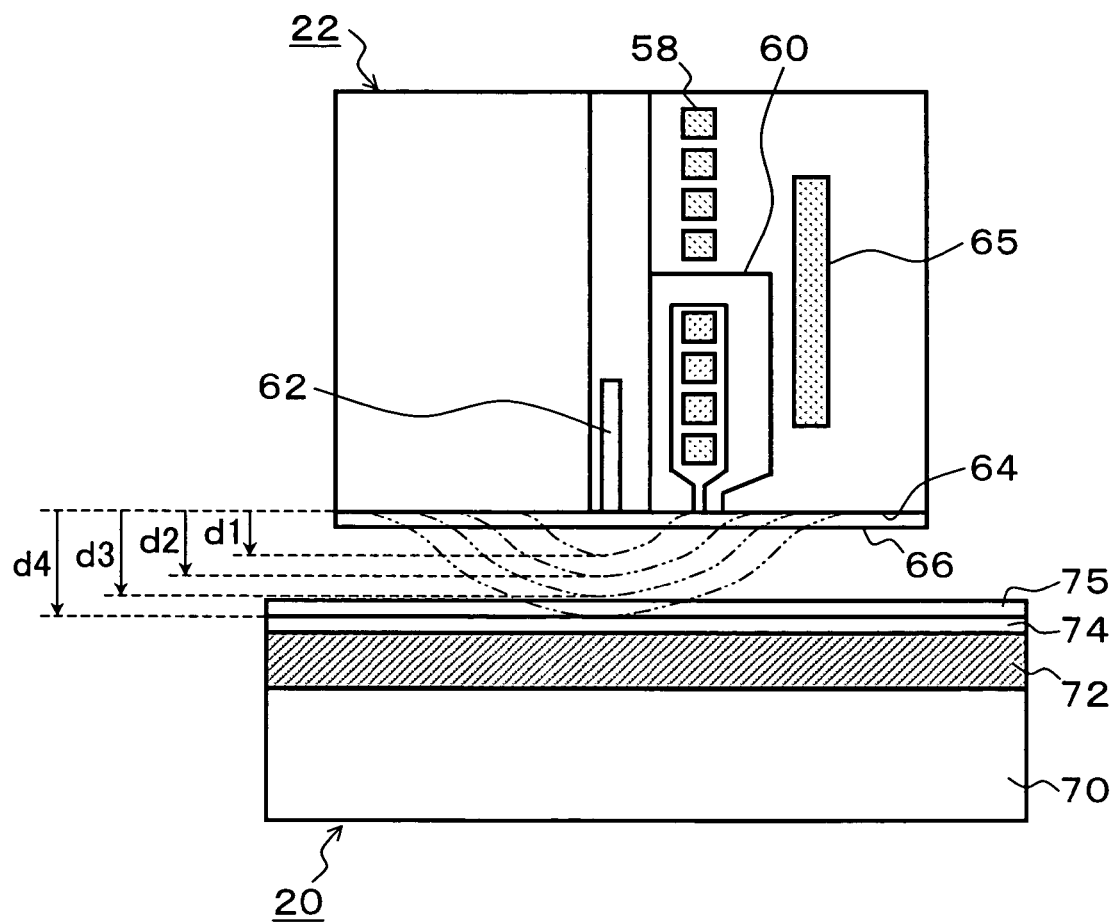
FIG. 12 is an explanatory diagram schematically showing head projection distance protrusion values accompanying heating of electric-power-distributed heater.

FIG. 12 is an explanatory diagram schematically showing the head projection distance protrusion value accompanying heating of the electric-power-distributed heater. In FIG. 12, electric power is distributed to the heater 65 of the head 22, wherein when the amount of distributed electric power is increased, the ABS surface 64 of the head where the bottom of the reading element 62 is positioned gradually projects as shown by imaginary lines, and the clearance changed distances d1, d2, d3, and d4 are increased. When the clearance changed distance d4 is attained, it comes into contact with the protective film 74 of the magnetic disk 20, thereby attaining the collided state; and, thereafter, even if the electric power of the heater 65 is increased, the projection cannot be increased since it is physically restricted. Regarding such change in the head projection distance protrusion value in accordance with electric power distribution to the heater 65, in the expression of (1) which is the space loss method of Wallace spacing loss, the clearance changed distances d1, d2, d3, and d4 in accordance with the gradual increase in the heater electric power distribution amount are calculated. Therefore, the clearance between the bottom of the reading element 62 and the recording film 72 of magnetic disc 20 to be measured when electric power is not distributed can be obtained by measuring the clearance changed distance d4 at the time when the head is projected along with heating by the heater 65 and brought into contact with the protective film 74 of the magnetic disk 20.

Figure 13:
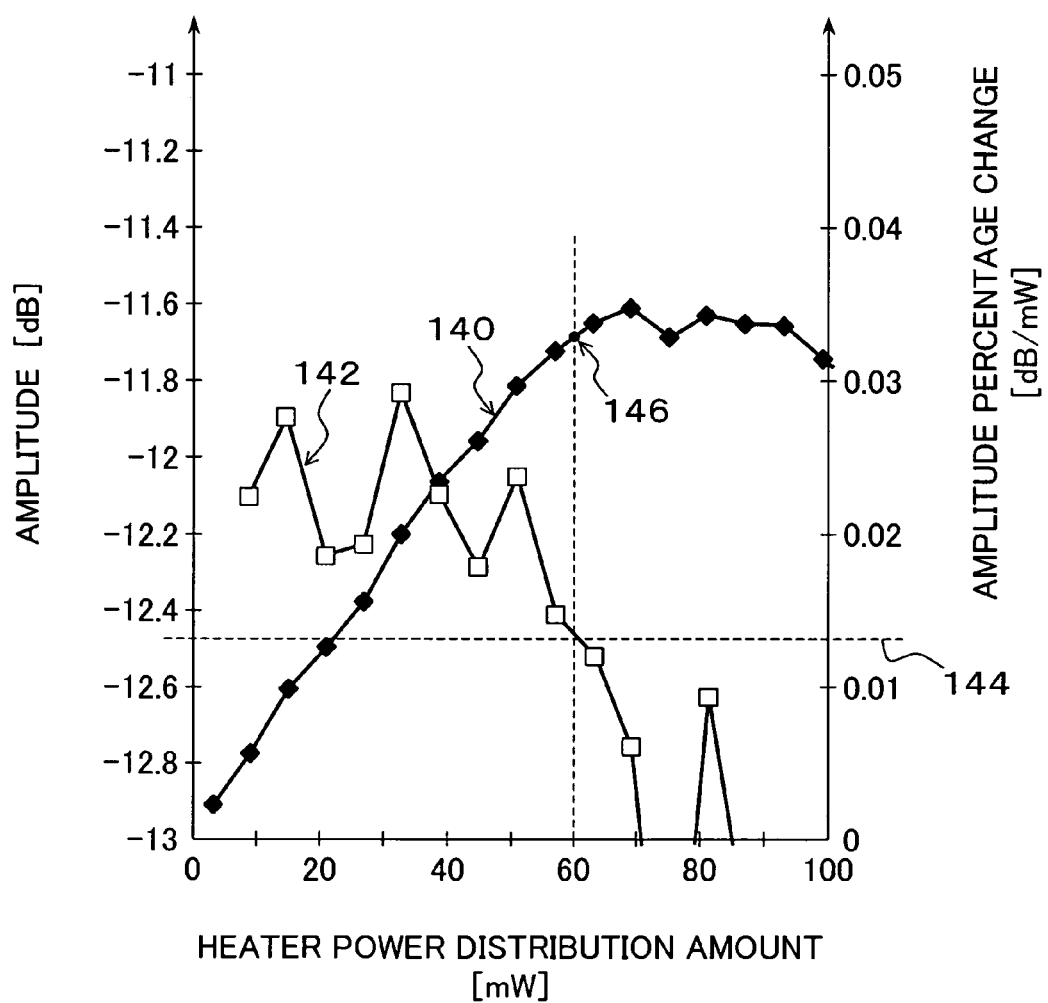
FIG. 13 is a graph diagram of clearance changed distances measured along with increase of electric power distribution amount of the heater and derivative values.

FIG. 13 is a graph chart showing amplitude measurement results of the preamble read signal measured along with increase in the amount of heater electric power distribution and derivative values thereof. In FIG. 13, with respect to increase in the heater electric power distribution amount p shown in the horizontal axis, amplitude 140 of the preamble read signal is increased approximately proportional to the heater electric power distribution amount p. When the heater electric power distribution amount p exceeds, for example, p=60 mW, increase in the amplitude is reduced, and then, approximately constant values are maintained. Amplitude percentage change 142 corresponding to the derivative values with respect to the change of the amplitude 140 has approximately constant percentage change until the heater electric power distribution amount p is increased to p=60 mW; however, the percentage change begins to decrease as it approach the electric power distribution amount of 60 mW and drops to percentage change of zero. According to such relation between the amplitude 140 and the amplitude percentage change 142, it can be determined that the projected part of the heated and expanded head comes into contact with the magnetic disk at the point when the heater electric power distribution amount p=60 mW is passed, and a collided state in which it cannot be projected more than that. Therefore, a predetermined threshold value 144 for determining collision of the head from the amplitude percentage change 142 is set, and a value 146 of the amplitude at the point when the amplitude percentage change 140 becomes lower the threshold value 144 is obtained as a measured value of the clearance. In the graph chart of FIG. 13, in order to see the change in the amplitude 140 and the amplitude percentage change 142 along with increase in the heater electric power distribution amount until collision, the heater electric power distribution amount p is increased also after the amplitude percentage change 142 becomes lower than the threshold value 142; however, in actual clearance measurement, the heater electric power distribution amount is not required to be increased more than that at the point when the amplitude percentage change 142 becomes lower than the threshold value 144, and, as a result, the clearance can be measured while electric power distribution, i.e., expansion and projection of the heater for measurement is stopped at the point immediately before head projection brings itself to come into contact with the magnetic disk. Therefore, in the clearance measurement in the present embodiment, since the contact with the magnetic disk due to head projection performed by electric power distribution to the heater is immediately before contact or in an early stage in which the contact force with the medium is tiny even when they are in contact, breakage of the head or the medium in contact/collision of the projected head with the disk can be suppressed to a minimum level. In the clearance measurement process shown in the flow chart of FIG. 9, medium collision is determined from the change in the clearance projection distance protrusion values calculated from the amplitude of the preamble read signals; however, as shown in FIG. 13, medium collision may be determined when the amplitude change in the preamble read signals is equal to or less than the threshold value, and the clearance projection distance protrusion value may be calculated from the signal amplitude at that point so as to use it as a clearance measured value.

Figure 14A:
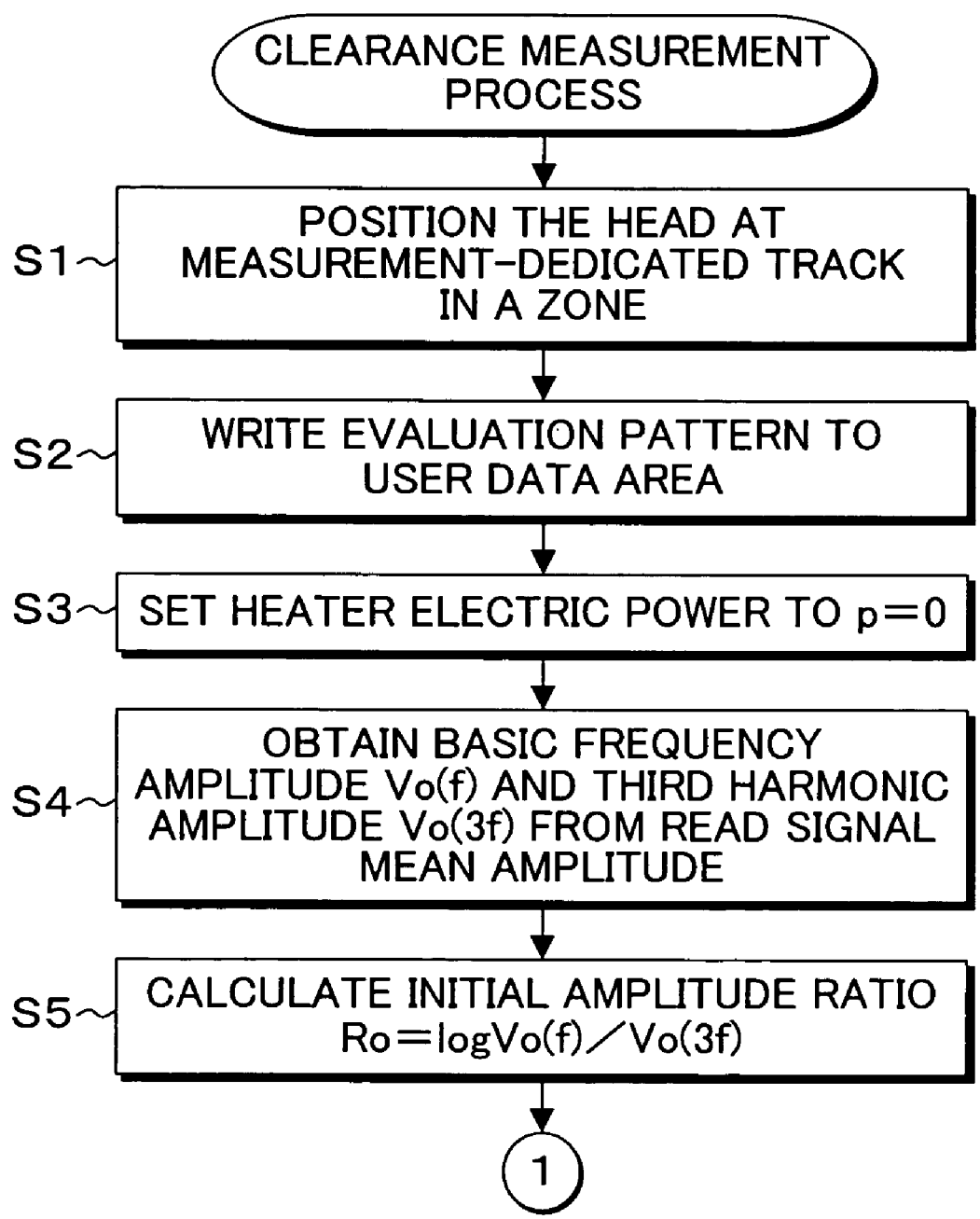
FIGS. 14A and 14B are flow charts of the clearance measurement process of step s3 of FIG. 8 using HRF method.
Figure 14B:
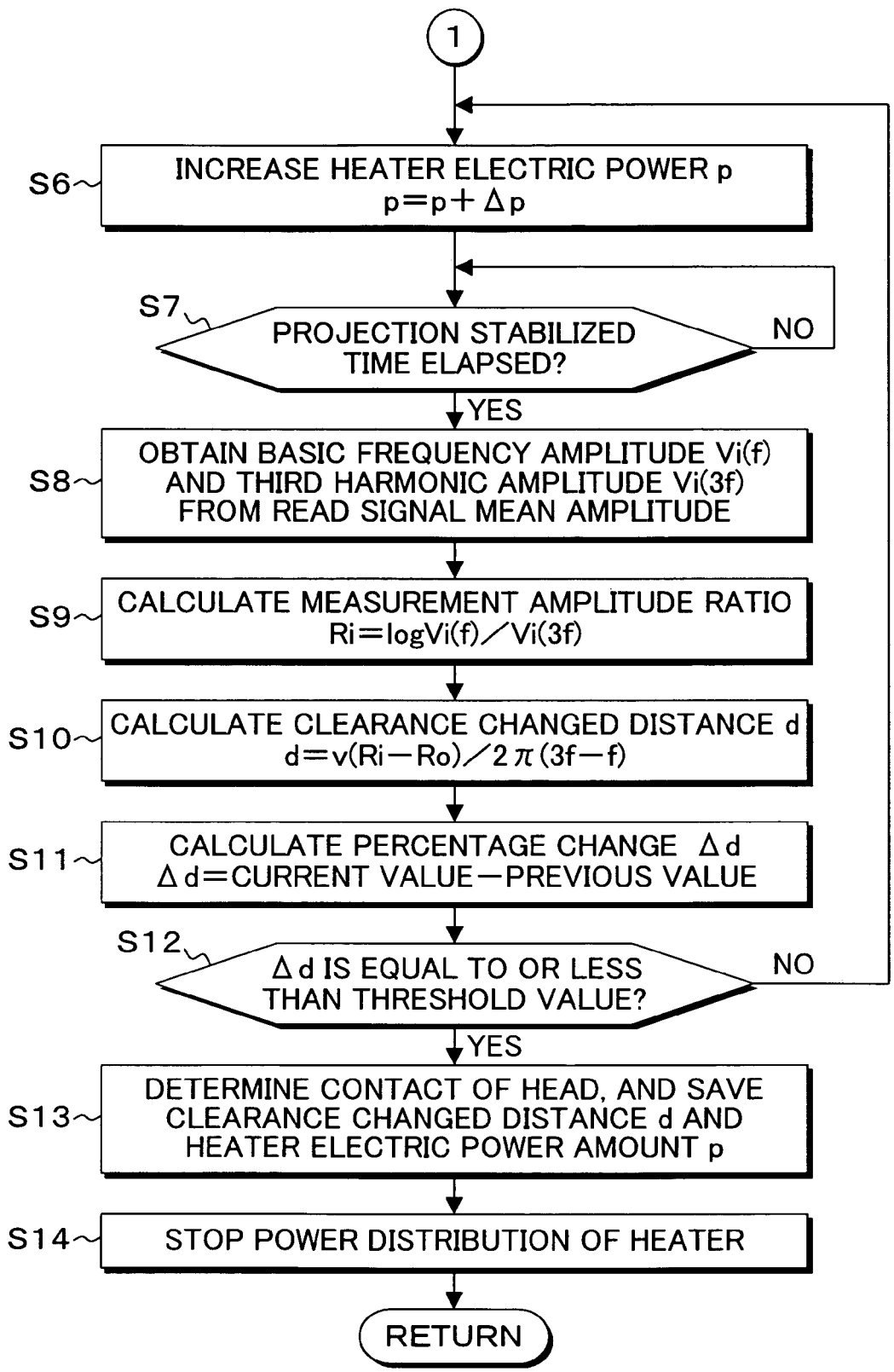

FIGS. 14A and 14B are flow charts of the clearance measurement process of step S3 of FIG. 8 using the HRF method. The clearance measurement according to the HRF method uses a measurement-dedicated track in which evaluation patterns of user data areas are recorded in advance.

The track 110 of FIG. 15 dedicated to measurement is comprised of the frames 112-1 to 112-n, and the frame 112-1 is comprised of the servo area 114 and the user data area 116 as shown in an enlarged manner in the lower side. The user data area 116 is divided into sectors 148-1 to 148-m as shown in an enlarged manner in the lower side.

The sector 148-1 includes, as shown in an enlarged manner in the lower side, a preamble area 150, a synchronization area 152, a sector number area 154, and, subsequent thereto, a user data area in which the pattern 156 for evaluation for measuring the clearance according to the HRF method is stored. As the pattern 156 for evaluation, a repeated pattern having a recording wavelength of 10 to 20 times the basic recording length of user data with which amplitude can be readily detected is used.

An ECC area 158 is provided after the pattern 156 for evaluation. Regarding the measurement-dedicated track for clearance measurement according to the HRF method, the patterns 156 for evaluation may be written in the user data areas 116 of the measurement objective track in a format processing step of the magnetic disk in the stage of manufacturing in a plant, or the evaluation patterns may be written upon measurement. The clearance measurement process based on the HRF method using the measurement-dedicated track in which the patterns 156 for evaluation as shown in FIG. 15 are recorded will be described below with reference to FIGS. 14A and 14B. In the first place, the head is positioned to the measurement-dedicated track in a zone in step S1, and then, evaluation patterns are written to the user data areas. The evaluation patterns are repeated patterns having a recording wavelength of 10 to 20 times the basic recording wavelength of user data which can be readily detected. At the same time, ECC data is written to the ECC area 158 which is subsequent to the evaluation pattern. Next, after the heater electric power p is set to p=0 in step S3, amplitude Vo(f) of a basic frequency f and amplitude Vo(3f) of a third harmonic wave are obtained from the mean amplitude of the read signal of the pattern for evaluation in step S4. Subsequently, an initial amplitude ratio Ro is calculated by the below expression in step S5.

$$Ro = \log\frac{Vo(f)}{Vo(3f)} \quad (3)$$

Next, the heater electric power p is increased merely by a predetermined value Δp in step S6, elapse of projection stabilized time is waited in step S7, then, amplitude Vi(f) of a basic frequency f and amplitude Vi(3f) of a third harmonic wave 3f are obtained from the mean amplitude of the read signal of the evaluation pattern in step S8, and a measurement amplitude ratio Ri is calculated by the below expression in step S9.

$$Ri = \log\frac{Vi(f)}{Vi(3f)} \quad (4)$$

Next, in step S10, based on the initial amplitude ratio Ro calculated in step S5 and the measurement amplitude ratio Ri calculated in step S9, the clearance changed distance d is calculated by the below expression.

$$d = \frac{v(Ri - Ro)}{2\pi(3f - f)} \quad (5)$$

Subsequently, in step S11, percentage change Δd of the clearance is calculated by subtracting the previous value from the current value. Next, whether the percentage change Δd is equal to or less than a predetermined threshold value is checked in step S12, and, if it is larger than the threshold value, return to step S6, the heater electric power p is further increased merely by Δp and the processes from step S7 are repeated. When the percentage change Δd is equal to or less than the threshold value in step S12, the process proceeds to step S13 wherein contact of the head is determined, the clearance changed distance d at that point is set as a measured clearance, and the heater electric power p at that point is saved.

Subsequently, electric power distribution to the heater is stopped in step S14. Although it is not shown, after the electric power distribution to the heater is stopped, like step S11 of the clearance measurement based on the space loss method of Wallace spacing loss of FIG. 9, the clearance distance, i.e., the heater projection sensitivity protrusion sensitivity e per unit heater electric power distribution amount is calculated by dividing the clearance changed distance d obtained in step S13 by the heater electric power distribution amount p at that point and saved.

Figure 16:
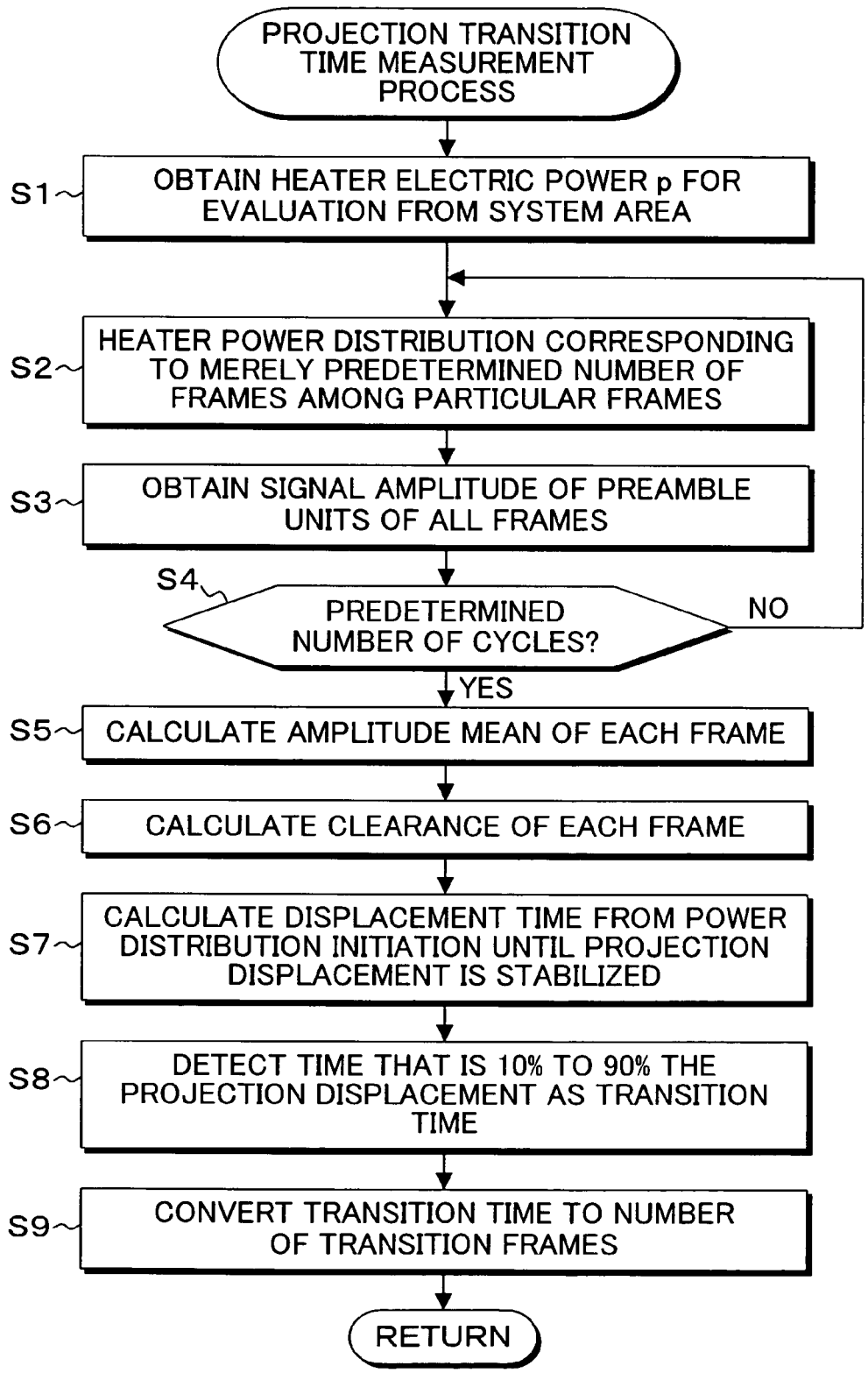
FIG. 16 is a flow chart of the projection transition time measurement process of step 5 of FIG. 8.

FIG. 16 is a flow chart of the heater projection transition time measurement time of step S5 of FIG. 8. In the clearance control according to the present embodiment, to know the transition time from distribution to the heater until head projection caused by thermal expansion is completed is important in recording or reading with respect to a target sector when the head is positioned to a target track. When the heater projection transition time is known, heater electric power distribution is started from a frame that is before the frame in which a target sector is present according to the heater projection transition time, such that the head projection state which maintains the clearance to a target value can be obtained when it reaches the target frame. Therefore, in the measurement process of the heater projection transition time of FIG. 16, heater electric power p for evaluation is obtained from the system area in step S1. The heater electric power p for evaluation is a value which is fixedly determined such that a head projection distance protrusion value corresponding to a clearance which is obtained in terms of design is attained.

Next, in step S2, a process of distributing electric power to the heater corresponding to merely a predetermined number of frames from a particular frame in the measurement objective track. The distribution to the heater is performed in the range of a predetermined number of frames starting from an index frame where an index signal can be obtained as the particular frame.

Subsequently, in step S3, in a state in which electric power distribution to the heater is repeated in the particular frame range, signal amplitude of the read signals of the preamble part of all the frames of the measurement objective track.

Subsequently, in step S4, whether a predetermined number of cycles, i.e., the number of rotations of the magnetic disk is achieved or not is determined in step S4, and, if the predetermined number of cycles is achieved, the mean value of the signal amplitude obtained for each frame is calculated in step S5.

Subsequently, in step 6, the clearance of each frame is calculated based on, for example, the space loss method of Wallace spacing loss.

Next, in step S7, displacement time from start of the electric power distribution to the heater until projection displacement of the clearance obtained in the calculation is stabilized is calculated.

Then, in step S8, the time from 10% to 90% the projection displacement is detected as projection transition time tp.

Finally, in step S9, the detected projection transition time tp is converted into the number of transition frames and recorded. As a matter of course, it may be saved as projection transition time without converting it into the number of frames.

Figure 17:
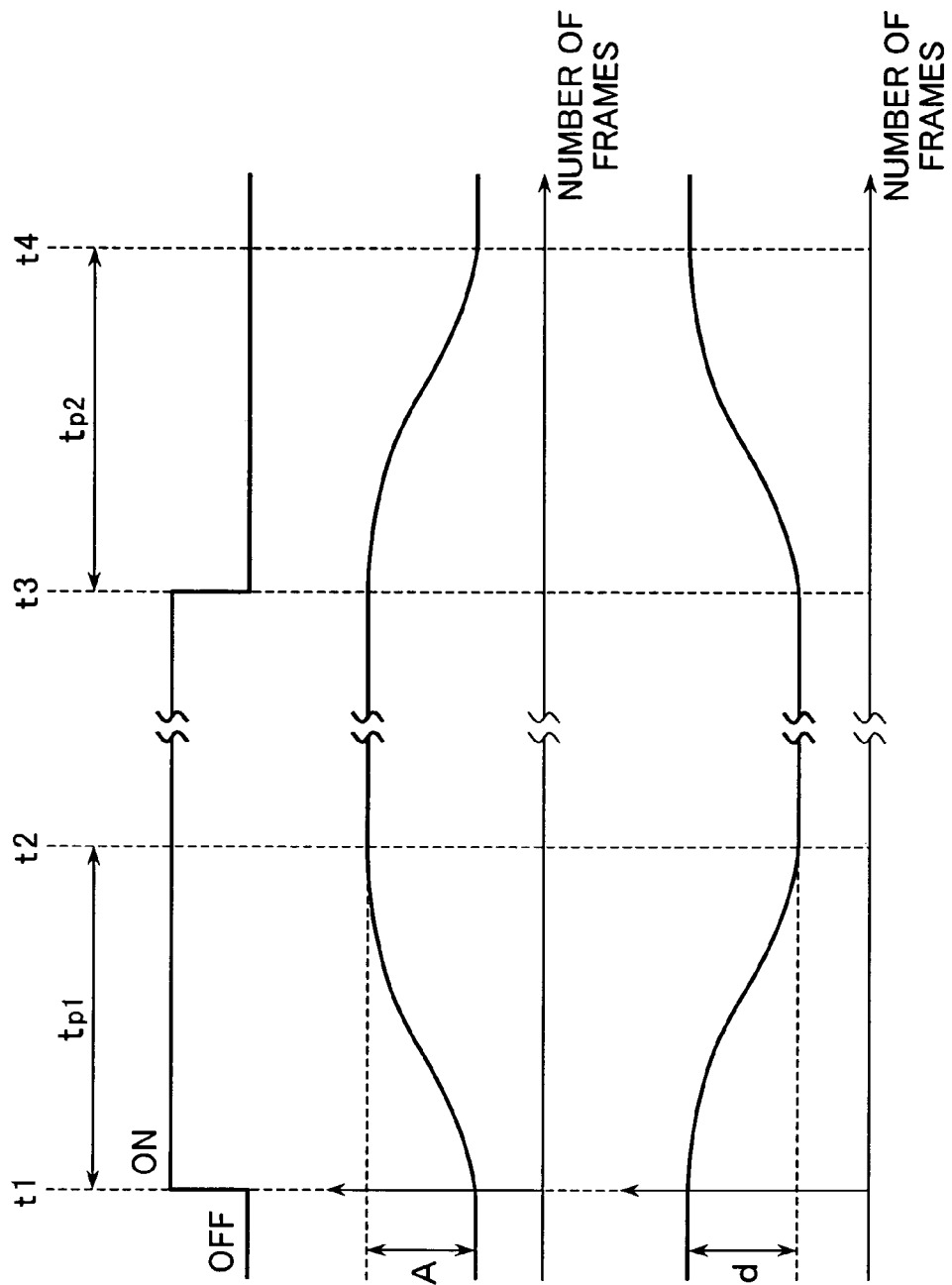
FIGS. 17A to 17C are explanatory diagrams of variation of read signal amplitude and clearance changed distance with respect to frame position along with heater electric power distribution.

FIGS. 17A to 17C are explanatory diagrams of variation of the read signal amplitude and the clearance changed distance with respect to frame position along with heater electric power distribution upon heater projection transition time measurement. FIG. 17A is heater control, wherein after it is turned on for a predetermined number of frames from an index frame or the like from time t1 starting, it is turned off at time t3, and this is repeated for each track rotation.

FIG. 17B is the read signal amplitude of each frame, wherein, in accordance with start of electric power distribution to the heater at time t1, the signal amplitude increases along with increase in the head projection distance protrusion value, and it is stabilized to constant amplitude from time t2 when head projection is completed.

Thereafter, when the electric power distribution to the heater is turned off at time t3, the signal amplitude is also reduced along with reduction in the head projection distance protrusion value, and the reduced amplitude is stabilized at a constant value from time t4. When the clearance changed distance is calculated by above described expression (3) based on such read signal amplitude of FIG. 17B, variation like FIG. 17C is obtained. Therefore, the projection transition time tp can be calculated by obtaining transition time tp1 from the electric power distribution start time t1 until the time t2 when projection is completed in the clearance changed distance and transition time tp2 from time t3 until time t4 when the heater is, inversely, turned off, detecting them corresponding to a predetermined number of cycles, and obtaining a mean value thereof.

Furthermore, regarding the calculated clearance transition time tp, the time in which the clearance changed distance is changed from 10% to 90% is detected and saved as projection transition time tp as a measurement result. The reason of detecting the time corresponding to 10% to 90% of the clearance changed distance as the transition time tp is as the following: the clearance changed distances at the points when distribution to the heater is started and when head projection is completed respectively have small percentage change, and respective changed positions are difficult to be specified; therefore, accurate transition time is obtained by reducing variation generated upon measurement by detecting the time for the range of 10% to 90% where the percentage change became large to some extent, and employing it as the projection transition time.

Figure 18:
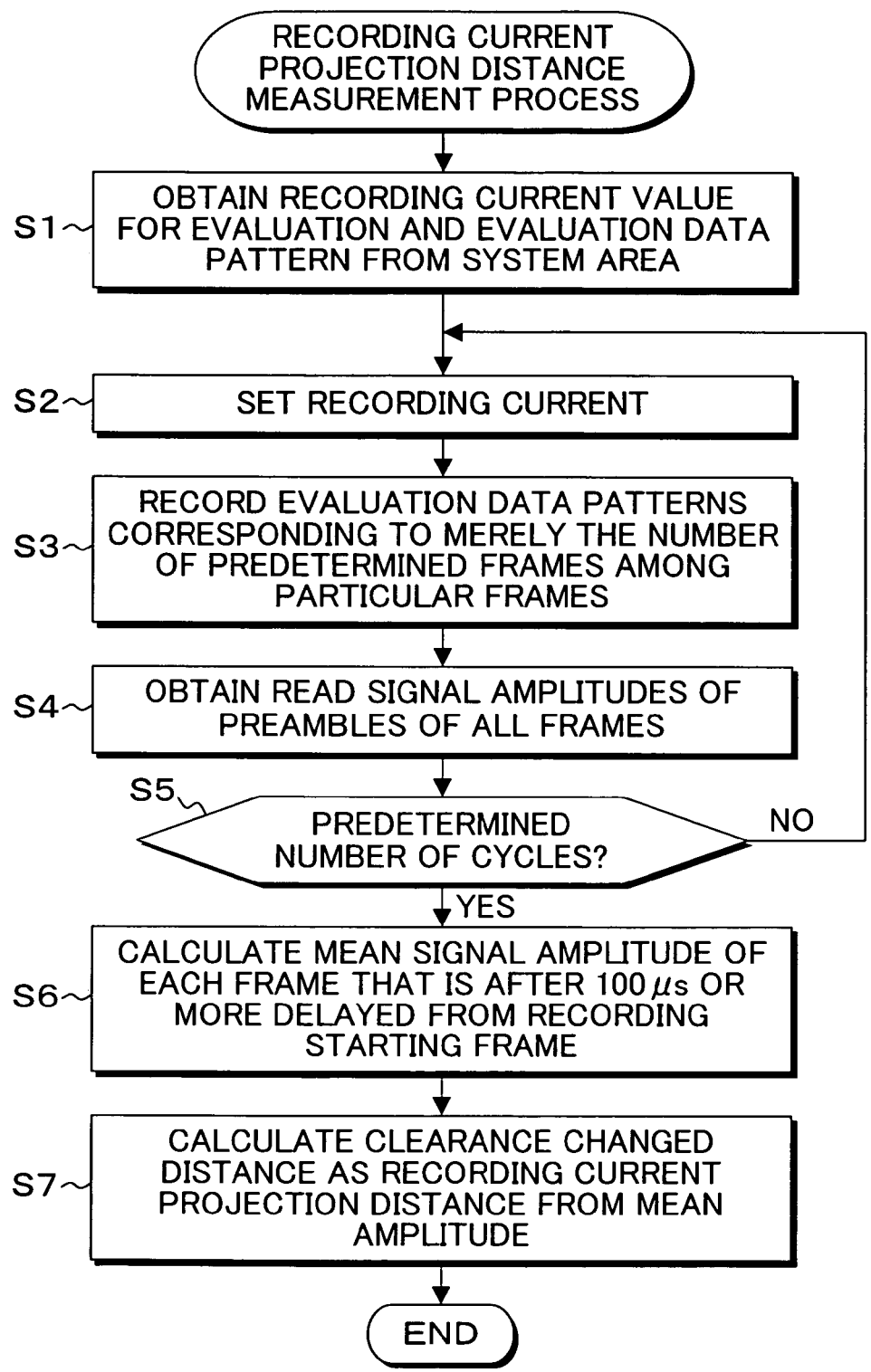
FIG. 18 is a flow chart of the recording current projection distance protrusion value measurement process of step s6 of FIG. 8.

FIG. 18 is a flow chart of the recording current projection distance protrusion value measurement process of step S6 of FIG. 8. In the clearance control of the present embodiment, when a recording current is caused to flow through the recording element, that is, the recording coil 58 provided in the head 22 of FIG. 3B upon recording, heating of the recording coil 58 caused by the recording current causes the ABS surface 64 of the head 22 to project to the side of the magnetic disk 20, and control of maintaining an accurate target clearance cannot be performed by head projection control merely by the heater 65 unless projection of the head due to the recording current is taken into consideration. Therefore, in the present embodiment, the head projection distance protrusion value due to the recording current which flows through the recording element is measured. In FIG. 18, in measurement of the recording current projection distance protrusion value, a recording current value for evaluation and an evaluation data pattern are obtained from the system area in step S1. Subsequently, in step S2, in a state in which the head is positioned to an arbitrary measurement objective track, a recording current is set for the write amplifier which is incorporated in the head IC 24 of FIGS. 1A and 1B. Subsequently, in step S3, the evaluation data pattern is recorded merely to a predetermined number of frames from a particular frame of the measurement objective track. The evaluation data pattern can be recorded starting from an index frame as the particular frame for the predetermined number of frames. A recording current is caused to flow through the recording coil and heated by recording of the recorded data pattern, and a head projection state corresponding to that is generated. Subsequently, in step S4, in parallel to the recording process of the evaluation data pattern of step S3, read signal amplitude of preambles of all the frames is obtained.

Whether the processes of steps S2 to S4 reached a predetermined number of cycles, that is, a predetermined number of tracks or not is determined in step S5; and, when the predetermined number of cycles is achieved, the mean of the signal amplitude of each frame that is after the recording started frame by, for example, 100 μsec or more is calculated. Then, in step S7, the clearance changed distance d based on, for example, the space loss method of Wallace spacing loss of the above described expression (3) is calculated from the calculated mean amplitude, and this is saved as a recording current projection distance protrusion value.

Figure 19:
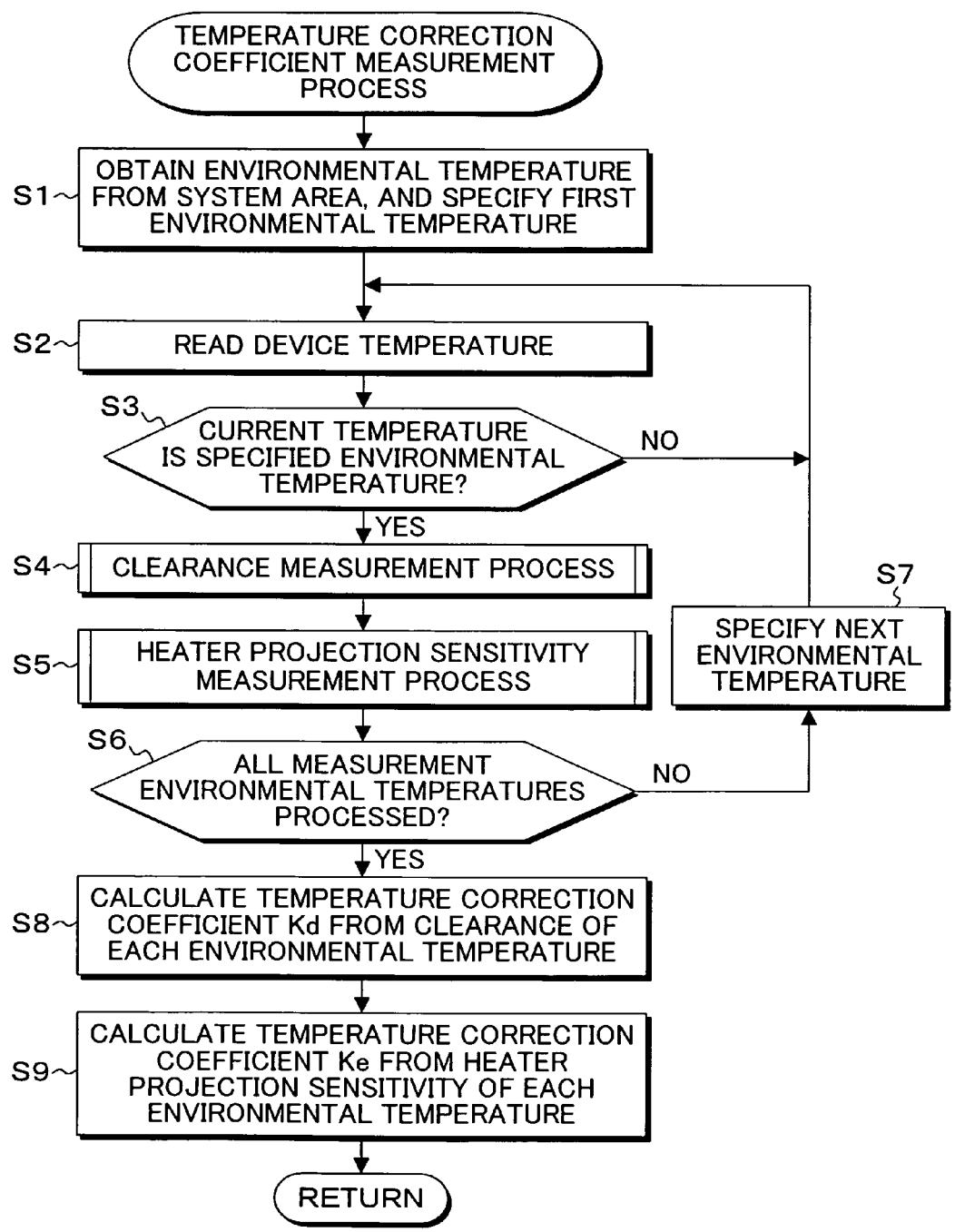
FIG. 19 is a flow chart of temperature correction coefficient measurement process of step s7 of FIG. 8.

FIG. 19 is a flow chart of the temperature correction coefficient measurement process of step S7 of FIG. 8. As shown in the clearance control information table 50 of FIG. 5, the values of the clearance 94, the heater projection sensitivity protrusion sensitivity 98, and the recording current projection distance protrusion value 102 are measured when the magnetic disk device is placed in the reference temperature, for example, an environmental temperature which is a room temperature of 20° C., and the device temperature in the stage of user operation after shipment is sometimes different from the reference temperature; therefore, temperature correction is required. The parameters for which temperature correction is required in the present embodiment are the clearance 94, the heater projection sensitivity protrusion sensitivity 98, and the recording current projection distance protrusion value 102 in the control information table 50 of FIG. 5. Therefore, the clearance temperature correction coefficients 106 for correcting the clearance 94 and the recording current projection distance protrusion value 102 are measured, and the projection sensitivity protrusion sensitivity temperature correction coefficients 104 for correcting the heater projection sensitivity protrusion sensitivity 98 are also measured. In the temperature correction coefficient measurement process of FIG. 19, an environmental temperature is obtained from the system area in step S1, and an initial environmental temperature is set. This environmental temperature is a value of a predetermined temperature step wherein the operating temperature range of the magnetic disk device is in a temperature range having, for example, 0° C. as a lower limit and 60° C. as an upper limit.

Subsequently, the device temperature is read in step S2, whether the current temperature is at the specified environmental temperature which is specified in step S1 or not is checked in step S3, and, if it is at the specified environmental temperature, the process proceeds to step S4 wherein a clearance measurement process is executed. This clearance measurement process may be either the clearance measurement process based on the space loss method of Wallace spacing loss shown in FIG. 9 or the clearance measurement process according to the HRF method shown in FIGS. 14A and 14B.

Next, a heater projection sensitivity protrusion sensitivity measurement process is executed in step S5. This heater projection sensitivity protrusion sensitivity measurement process is same as the process of the flow chart of FIG. 16. Next, whether all measured environmental temperatures have been processed or not is checked in step S6; and, if they have not been processed, a next environmental temperature is specified in step S7, and the processes from step S2 are repeated. When processes of all the measured environmental temperatures are finished, the process proceeds to step S8 wherein a temperature correction coefficient Kd is calculated from the clearance of each environmental temperature.

Subsequently, a temperature correction coefficient Ke is calculated from the heater projection sensitivity protrusion sensitivity of each environmental temperature in step S9.

Figure 20:
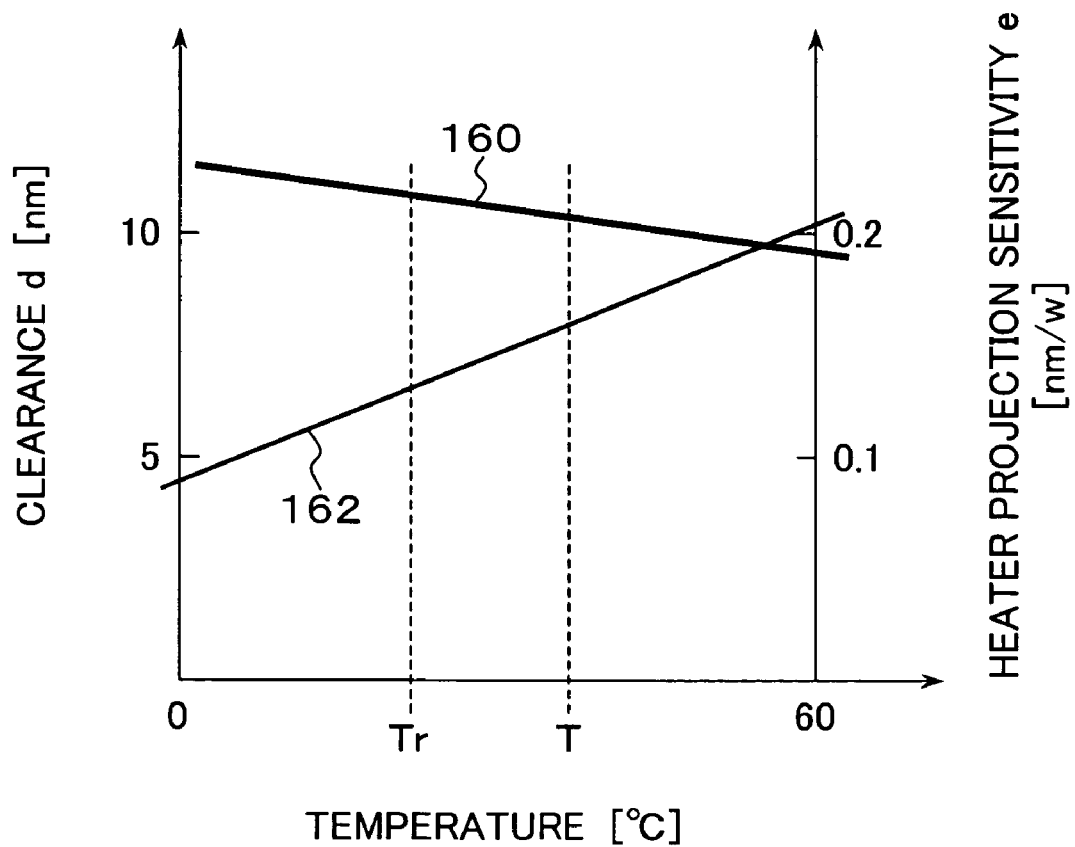
FIG. 20 is a graph diagram showing variation of clearance and heater projection sensitivity protrusion sensitivity with respect to device temperature.

FIG. 20 is a graph chart showing variation of the clearance and heater projection sensitivity protrusion sensitivity with respect to the device environmental temperature in the temperature correction coefficient measurement process of FIG. 19. In FIG. 20, when a range of 0° C. to 60° C. is set as an operating temperature range, and the amount of heater electric power distribution is constant with respect to the temperature variation in this range, there is a correlation that variation of the clearance d is reduced along with increase in the temperature; therefore, a positive clearance correction coefficient Kd is calculated as the temperature correction coefficient.

On the other hand, regarding the heater projection sensitivity protrusion sensitivity e, there is a correlation that it is increased in proportion to the temperature increase. Therefore, a negative temperature coefficient is calculated as the temperature correction coefficient Ke of the heater projection sensitivity protrusion sensitivity.

When the clearance temperature correction coefficient Kd and the heater projection sensitivity protrusion sensitivity temperature correction coefficient Ke are calculated and maintained in this manner, control for maintaining an accurate target clearance can be realized by use of the control parameters which have undergone temperature correction to values in an environmental temperature in which the magnetic disk device is actually used with respect to the clearance and heater projection sensitivity protrusion sensitivity obtained at the reference temperature.

The recording current projection distance protrusion value dw required upon recording can be subjected to temperature correction by use of the clearance temperature correction coefficient Kd for performing temperature correction of the clearance do. In temperature correction, when the reference temperature is Tr and the current device temperature is T in FIG. 20, the clearance do, the recording current projection distance protrusion value dw, and the heater projection sensitivity protrusion sensitivity e are subjected to temperature correction:

$$do = do' + Kd \cdot \Delta T$$

$$dw=dw'+Kd\cdot\Delta T$$

$$e=e'+Ke\cdot\Delta T.$$

Figure 21:
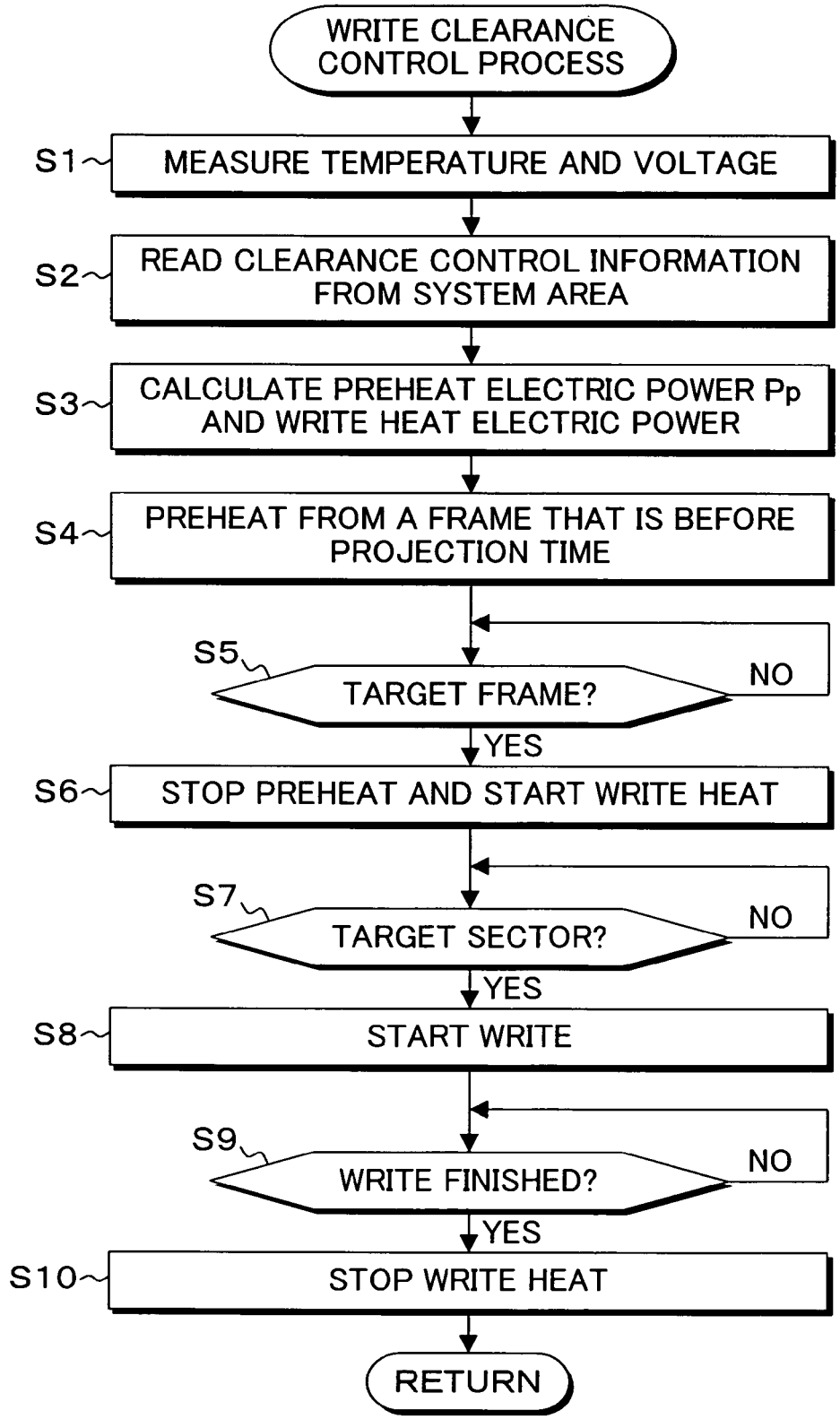
FIG. 21 is a flow chart of the write clearance control process of step S6 of FIG. 6.

FIG. 21 is a flow chart of the write clearance control process in step S6 of FIG. 6. The write clearance control process is executed in the state in which the head is subjected to seek control and positioned to the target track based on the write command in step S5 of FIG. 6. First, the temperature and voltage are measured in step S1, and the clearance control information is read from the system area in step S2. The clearance control information is read from the clearance control information table 50 deployed to the memory 30 as shown in FIGS. 1A and 1B in practice. Then, preheat electric power Pp and write heat electric power Pw are calculated in step S3. In the write clearance control of the present embodiment, expansion/projection caused by heater electric power distribution has to be completed such that a write target clearance is achieved when the head reaches a target frame of the target track, that is, the target frame in which a target sector is present. Therefore, with respect to the target frame, preheating is started before the heater projection transition time tp, that is, from a frame position which is before the target frame by a number of frames converted from the heater projection transition time tp. Since there is no recording current which flows through the recording element in the preheating, heater electric power p required for obtaining the write target clearance is calculated.

More specifically, when the clearance obtained subsequent to the target track is do, the target clearance is dp, the heater projection sensitivity protrusion sensitivity is e, the heater projection sensitivity protrusion sensitivity temperature correction coefficient is Ke, the clearance temperature correction coefficient is Kd, the reference temperature is Tr, and the device temperature is T, after the clearance do, the recording current projection distance protrusion value dw, and the heater projection sensitivity protrusion sensitivity e are subjected to temperature correction:

$$do=do'+Kd\cdot\Delta T$$

$$dw=dw'+Kd\cdot\Delta T$$

$$e=e'+Ke\cdot\Delta T,$$

the preheat electric power Pp is calculated by the below expression.

$$Pp = \frac{do - dp}{e} \quad (6)$$

Such preheating by the preheat electric power Pp is performed until the target frame, the preheat electric power Pp is turned off when it reaches the target frame, and it is switched to the write heat electric power Pw. The write heat electric power Pw can be provided by further including the recording current projection distance protrusion value dw by the below expression.

$$Pw = \frac{do - dp - dw}{e} \quad (7)$$

When the preheat electric power Pp and the write heat electric power Pw are calculated in step S3 in this manner, preheating is started from step S4 by distributing the preheat electric power Pp to the heater from a frame that is before the heater projection transition time with respect to the track obtained from the system area In this state of preheating, arrival to the target frame is checked in step S5; and, when it arrives at the target frame, the preheating is stopped in step S6, and write heat of distributing the write heat electric power Pw to the heater is started. In this state of write heating, when arrival to the target sector is determined in step S7, write is started in step S8; and, when write termination is determined in step S9, the write heating is stopped in step S10. By virtue of such preheating and write heating, the head projection distance protrusion value is controlled to a predetermined write target clearance when the target frame reaches the head, and data write to the magnetic disk can be performed with an optimal clearance between the head and the magnetic disk.

Figure 22:
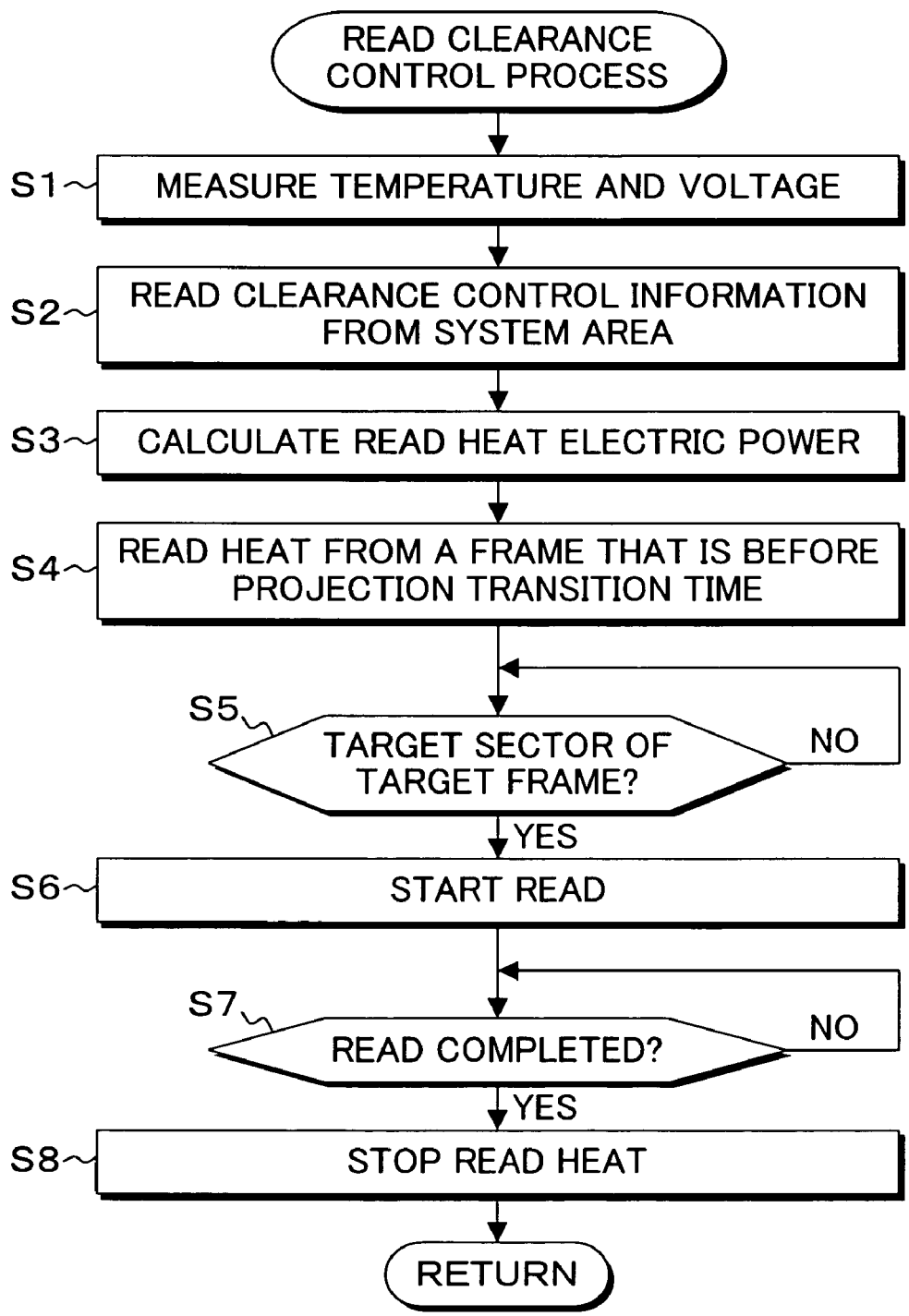
FIG. 22 is a flow chart of the read clearance control process of step S10 of FIG. 6.

FIG. 22 is a flow chart of the read clearance control process of step S10 of FIG. 6. The read clearance control process is executed in the state in which the head is positioned to the target track by decoding the read command; wherein, first, after the temperature and voltage are measured in step S1, the control parameters corresponding to the zone including the target track like that shown in the clearance control information table 50 of FIG. 5 are obtained from the system area in step S2, and then, read heat electric power Pr is calculated in step S3. When the clearance is do, the read target clearance is dp, the heater projection sensitivity protrusion sensitivity is e, the heater projection sensitivity protrusion sensitivity temperature correction coefficient is Ke, the clearance temperature correction coefficient is Kd, the reference temperature is Tr, and the current temperature is T, after the clearance do and the heater projection sensitivity protrusion sensitivity are subjected to temperature correction:

$$do=do'+Kd\cdot\Delta T$$

$$dw=dw'+Kd\cdot\Delta T$$

$$e=e'+Ke\cdot\Delta T,$$

the read heat electric power Pr is provided by the below expression.

$$Pr = \frac{do - dp}{e} \quad (8)$$

Next, in step S4, read heat is started by feeding the read heat electric power Pr calculated in step S2 to the heater from a frame that is before the heater projection transition time tp. When it reaches the target frame in the state of the read heating, head projection caused by heater electric power distribution is completed, and the clearance is controlled to the read target clearance. When arrival to the target sector of the target frame is determined in this state in step S5, read is started in step S6. Subsequently, when read completion is determined in step S7, the read heat is stopped at the timing of the next frame in step S8. In the above described embodiment, the clearance between the head and the magnetic disk is measured for each zone and saved in the system area, and it is read upon reproduction or recording so as to control the clearance to a target clearance; however, as another embodiment, it is possible to measure the clearance for each track of the magnetic disk and record it in the servo area of each frame of the measured track or a newly provided clearance area in a non-data area so as to control it to a target clearance by use of the clearance measured for each track.

Figure 23:
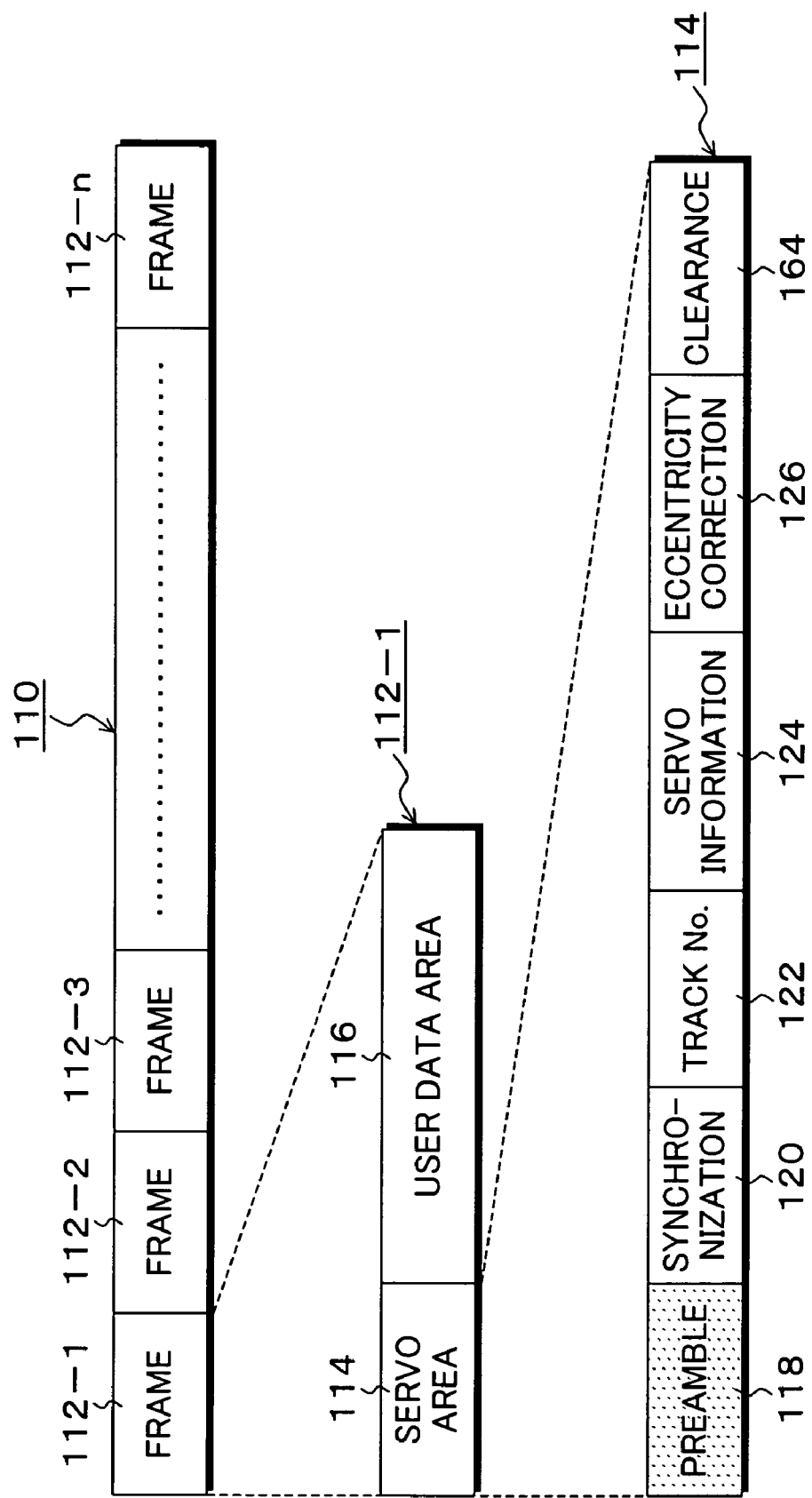
FIG. 23 is an explanatory diagram of a track of an embodiment in which clearance is measured and recorded for each track.

FIG. 23 is an explanatory diagram of the track of the another embodiment in which the clearance of each track is measured. In FIG. 23, the track 110 is comprised of the frames 112-1 to 112-*n*, and, as representatively shown in the frame 112-1, each frame is comprised of the servo area 114 and a user data area 116. Among these, in the servo area 114, in the present embodiment, a clearance area 164 is newly provided subsequent to the preamble area 118, the synchronization area 120, the track number area 122, the servo information area 124, and the eccentricity correction area 126, and the clearance measured for this track 110 is recorded in the clearance area 164.

Figure 24A:
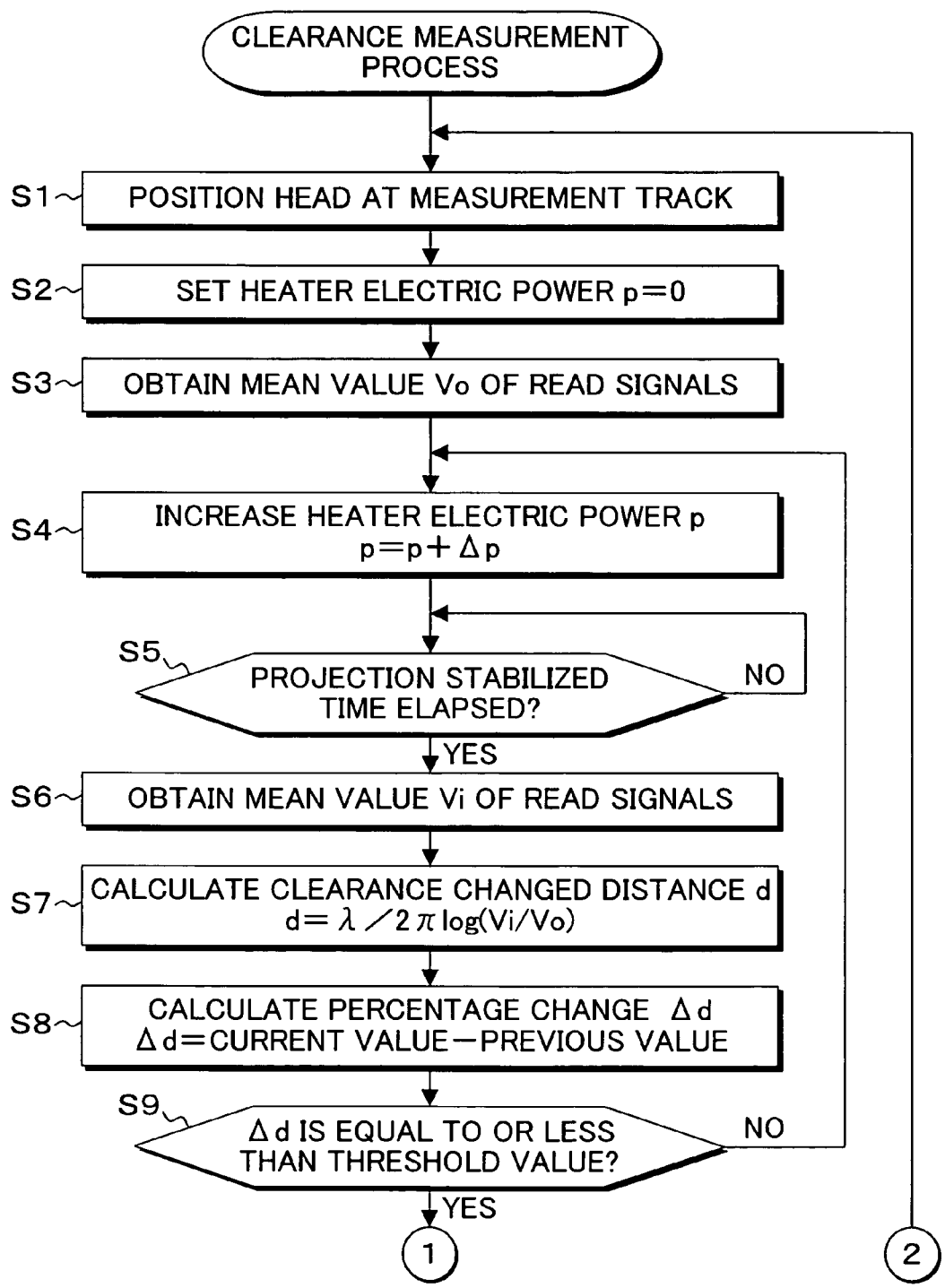
FIGS. 24A and 24B are flow charts of a clearance measurement process in which clearance is measured and written in track unit.
Figure 24B:
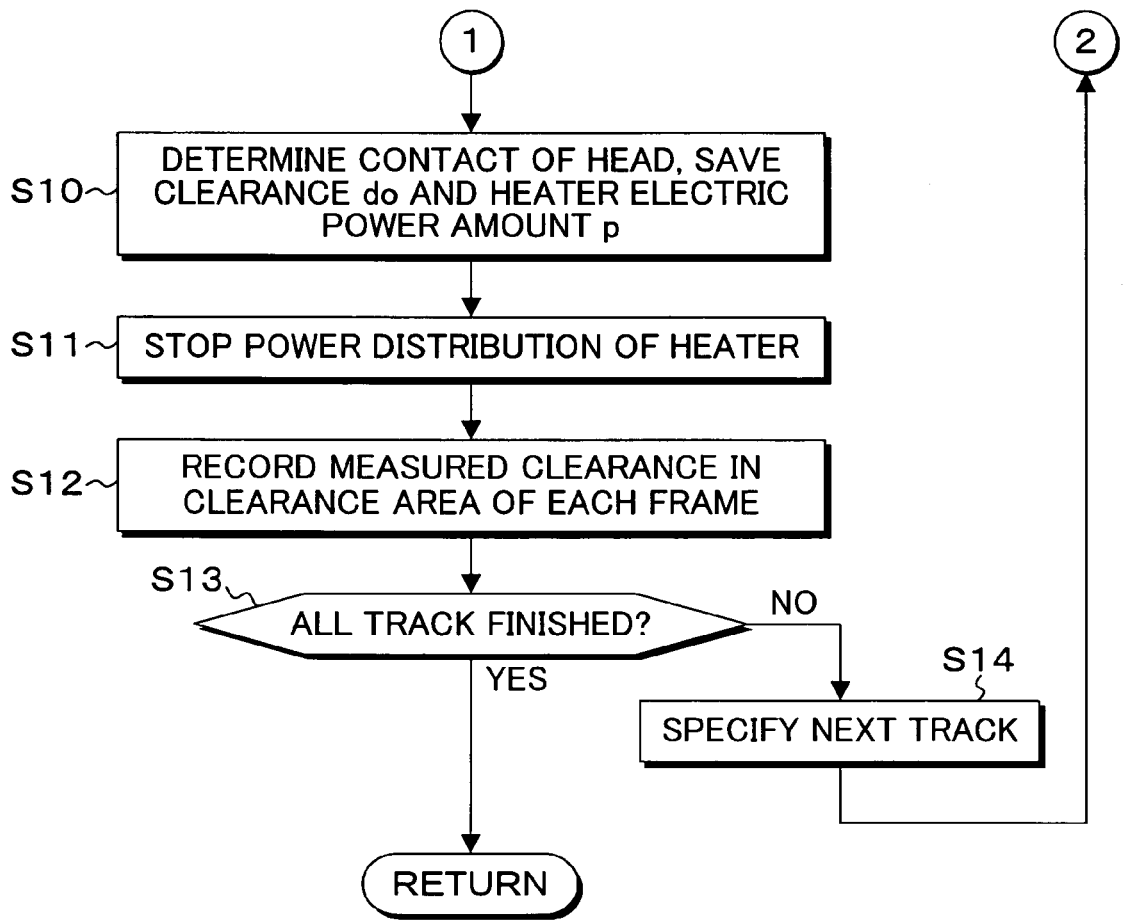

FIGS. 24A and 24B flow charts of the clearance measurement process for recording and writing the clearance in a track unit. In the clearance measurement process of FIGS. 24A and 24B, the head is positioned to the measurement track in step S1, and, after the heater electric power p is set to p=0 in step S2, an amplitude mean value Vo of the read signal of the preamble of each frame is obtained. Subsequently, the heater electric power p is increased merely by Δp in step S4, elapse of the projection stabilized time is waited in step S5, and a mean value Vi of the read signal of the preamble of each frame is obtained in step S6.

Subsequently, in step S7, the clearance changed distance d is calculated by the above described expression (3) based on the space loss method of Wallace spacing loss. Subsequently, after the percentage change Δd is calculated in step S8, whether the percentage change Δd is equal to or lower than a threshold value is determined in step S9. When it is determined to be equal to or lower than the threshold value, contact of the head is determined and the clearance do and the heater electric power p at that point are saved in step S10, and electric power distribution to the heater is stopped in step S11. Subsequently, the measured clearance do is recorded in the clearance area of each frame in step S12.

Subsequently, whether processes of all the tracks are finished or not is checked in step S13, and, when they are unfinished, a next track is specified in step S14, and the processes from step S1 is repeated until all the tracks are finished.

Figure 25:
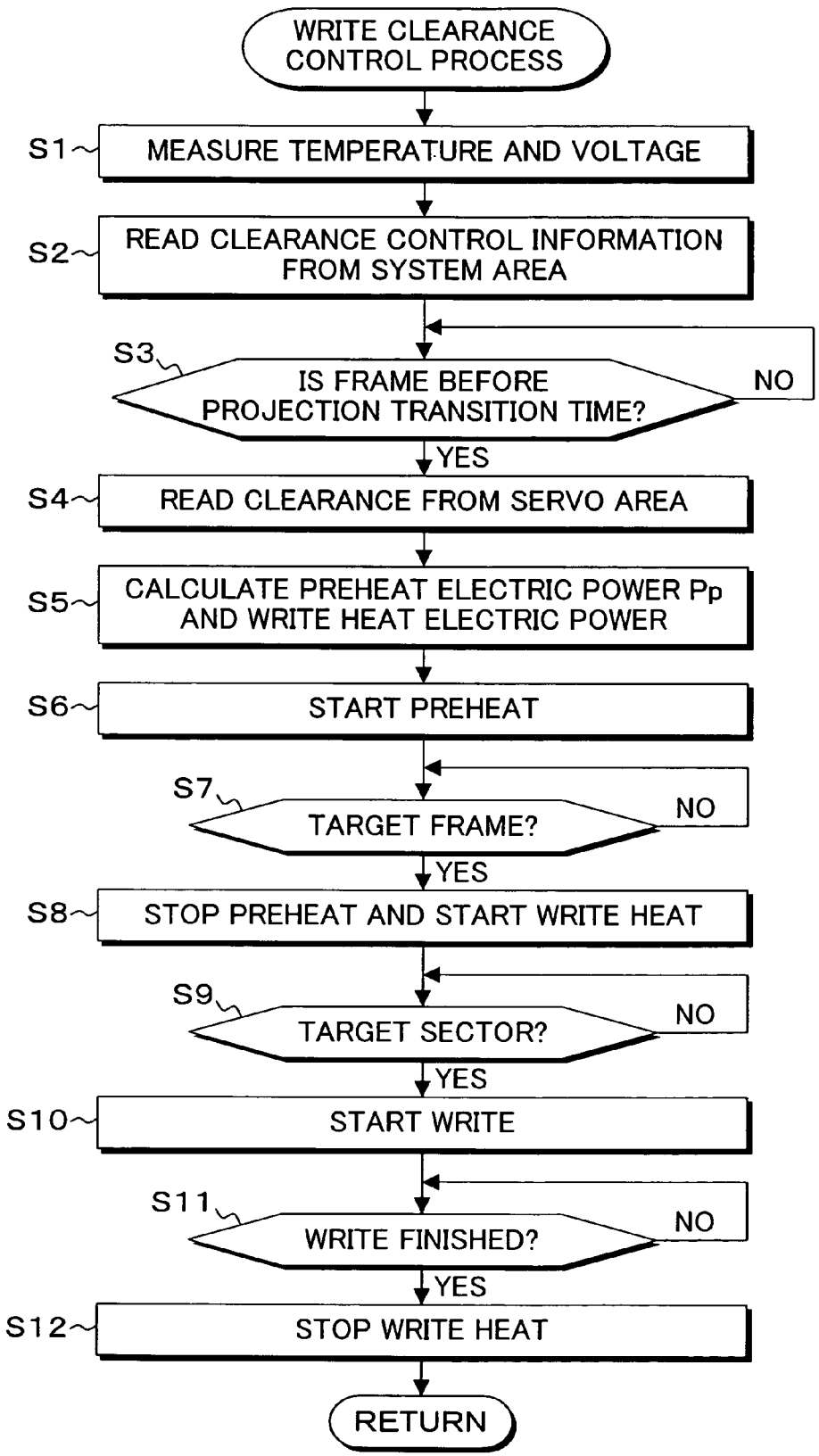
FIG. 25 is a flow chart of a write clearance control process performed by reading clearance recorded in track.

FIG. 25 is a flow chart of write clearance control which is performed by reading the clearance recorded in the track. Except for that the clearance measured and recorded for the target track like FIG. 23 is read from the clearance area 164 of the servo area 114 in step S4, the write clearance control process of FIG. 25 is same as the case of the write clearance control process of FIG. 21. When the write clearance control is performed in this manner such that the clearance recorded in the track unit is read and the target clearance is achieved, compared with the case in which the clearance is measured and recorded for each zone, control in the track unit with respect to the target clearance can be further optimized.

Figure 26:
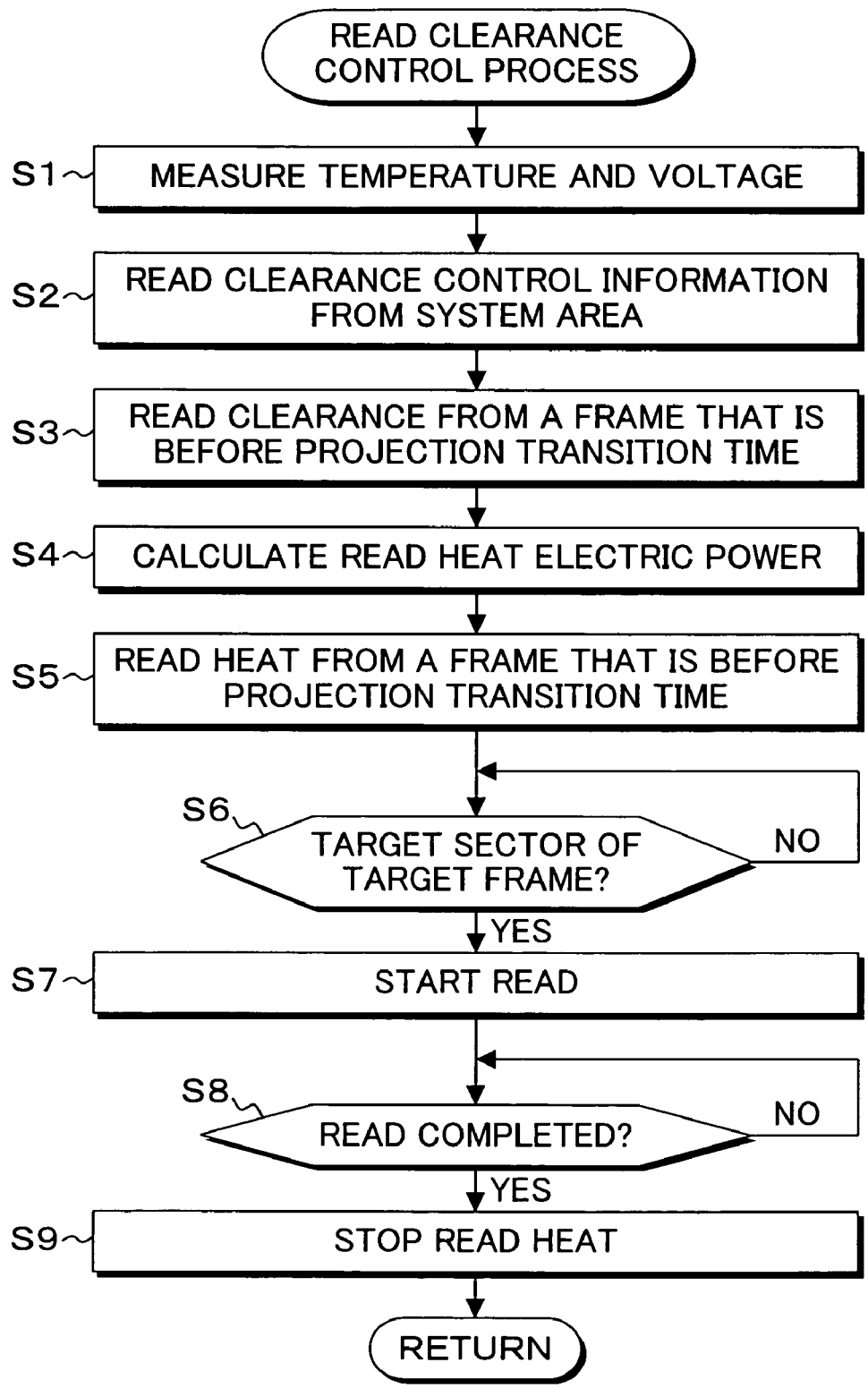
FIG. 26 is a flow chart of a read clearance control process performed by reading clearance recorded in track.

FIG. 26 is a flow chart of read clearance control performed by reading the clearance recorded in the track. Except for that the clearance is read from the servo area of a frame which is before the projection transition time with respect to the target frame in step S3, the read clearance control process of FIG. 26 is same as the read clearance control process shown in FIG. 22. Also in this read clearance process of FIG. 26, by controlling the read heat electric power of the heater by reading the clearance recorded for each track upon reading, control to the target clearance in the read clearance control can be performed with high precision, and the read performance can be improved compared with the case in which it is measured and recorded for each zone.

In addition, the present invention provides programs executed in the MPU 26 provided in the magnetic disk device, and the programs have the contents shown in the flow charts of FIG. 6 to FIG. 9, FIG. 14A, FIG. 14B, FIG. 16, FIG. 18, FIG. 19, FIG. 21, FIG. 22, and FIG. 24A to FIG. 26. It should be noted that the present invention includes arbitrary modifications that do not impair the object and advantages thereof and is not limited by the numerical values shown in the above described embodiments.

What is claimed is:
1. A storage device comprising:
a head having at least either one of a reading element and a recording element and provided with a heater for changing a projection distance protrusion value by thermal expansion accompanying electric-power-distributed heating for accessing data by floating above a rotating recording medium;
a clearance information measurement unit for measuring clearance information required for controlling a clearance between the reading or recording element and the recording medium upon desired correction; and
a clearance control unit for controlling the clearance to a predetermined target clearance upon reproduction or recording by changing the projection distance protrusion value of the head by varying the electric power distributed to the heater,
wherein the recording medium is divided into a plurality of zones in a radial direction, and the clearance information measurement unit measures the clearance information for each of the zones and saves the information in the recording medium or a system area of a memory.
2. The storage device according to claim 1, characterized in that the clearance information measurement unit has
a clearance measurement unit for measuring a clearance do at a reference temperature,
a projection sensitivity protrusion sensitivity measurement unit for measuring heater projection sensitivity protrusion sensitivity e which is a head projection distance protrusion value per unit electric power distributed to the heater at the reference temperature,
a transition time measurement unit for measuring projection transition time tp from distribution of electric power to the heater until projection deformation of the head is completed,
a recording current projection distance protrusion value measurement unit for measuring a recording current projection distance protrusion value dw of the head when a recording current is caused to flow through the recording head at the reference temperature,
a first temperature correction coefficient measurement unit for measuring a first temperature correction coefficient Kd for correcting the clearance do and the recording current projection distance protrusion value dw measured at the reference temperature to values at a temperature in clearance control, and
a second temperature correction coefficient measurement unit for measuring a second temperature correction coefficient Ke for correcting the heater projection sensitivity protrusion sensitivity e measured at the reference temperature to a value at the temperature in clearance control.
3. The storage device according to claim 2 characterized in that the projection transition time measurement unit obtains mean amplitude of preamble read signals of servo areas by repeating the electric power distribution to the heater over a range of a predetermined number of frames in the state in which the head is positioned to an arbitrary measurement objective track and detects time from start of the electric power distribution to the heater until the amplitude change is stabilized as the projection transition time tp.

4. The storage device according to claim 3 characterized in that the projection transition time measurement unit detects, as the projection transition time tp, time which is 10% to 90% of the amplitude change from start of the electric power distribution to the heater until the amplitude change is stabilized.

5. The storage device according to claim 2, characterized in that the projection transition time measurement unit obtains mean amplitude of preamble read signals from servo areas while writing a random pattern having a predetermined recording density to user data areas by the recording head over a range of a predetermined number of frames in a state in which the head is positioned to an arbitrary measurement objective track, and detects the recording current projection distance protrusion value dw by calculating a clearance changed distance from the mean amplitude.

6. The storage device according to claim 1, characterized in that the clearance information measurement unit measures a clearance changed distance while increasing the electric power distributed to the heater, determines that the head is in contact with the recording medium when a derivative value of the clearance changed distance is below a predetermined threshold value, and employs the clearance changed distance at the point of the determination as a measurement result of the clearance.

7. The storage device according to claim 6, characterized in that the clearance measurement unit has
- an amplitude detection unit for detecting amplitude of a read signal from a preamble part in a servo area of each frame of the recording medium by the reading head in a state in which the head is positioned to an arbitrary measurement objective track,
- an initial amplitude retaining unit for retaining initial amplitude Vo detected by the amplitude detection unit before electric power is distributed to the heater,
- a measured amplitude retaining unit for retaining measured amplitude Vi detected by the amplitude detection unit upon measurement when electric power is distributed to the heater, and
- a calculating unit for calculating the clearance changed distance d $$d = \frac{\lambda}{2\pi} \log\left(\frac{Vi}{Vo}\right)$$

as based on a recording wavelength λ of the preamble part, the initial amplitude Vo, and the measured amplitude Vi.

8. The storage device according to claim 7, characterized in that the amplitude detection unit detects the amplitude of the read signal from an automatic gain control signal with respect to a variable gain amplifier for amplifying the read signal obtained from the reading element.

9. The storage device according to claim 6 characterized in that the projection sensitivity protrusion sensitivity measurement unit calculates the heater projection sensitivity protrusion sensitivity e as a value obtained by dividing the clearance measured by the clearance measurement unit by the electric power distributed to the heater when collision is determined.

10. The storage device according to claim 1, characterized in that the clearance information measurement unit measures amplitude of a read signal from a preamble part in a servo area in each frame of the recording medium by the reading head while increasing the electric power distributed to the heater, determines that the head is in contact with the recording medium when a derivative value of the amplitude with respect to the electric power amount is below a predetermined threshold value, and calculates the clearance from the amplitude at the point of the determination and amplitude at the time when electric power is not distributed to the heater.

11. The storage device according to claim 1, characterized in that the clearance control unit has
- a write clearance control unit for controlling the electric power distribution to the heater upon a write to the recording medium by the recording element such that the clearance is a predetermined write target clearance, and
- a read clearance control unit for controlling the electric power distribution to the heater upon a read from the recording medium by the reading element such that the clearance is a predetermined read target clearance.

12. The storage device according to claim 11, characterized in that the write clearance control unit has
- a clearance information obtaining unit for obtaining a clearance do, a write target clearance dp, a recording current projection distance protrusion value dw, heater projection sensitivity protrusion sensitivity e, projection transition time tp, a first temperature correction coefficient Kd and a second temperature correction coefficient Ke corresponding to a target record track from the recording medium or a system area of a device memory;
- a preheat control unit for preliminary heating the heater by distributing preheat electric power to the heater form a frame position which is before the projection transition time tp with respect to a target frame in which a target sector is present; and
- a write heat control unit for switching the preheat electric power to write heat electric power for control to the target clearance when arriving at the target frame and stopping heater electric power distribution at a next frame position after recording is finished.

13. The storage device according to claim 12, characterized in that the clearance information obtaining unit obtains the clearance do from a clearance information area in a servo area of a frame which is before the projection transition time tp with respect to the target frame.

14. The storage device according to claim 12, characterized in that, when a reference temperature is Tr and a device temperature is T, the preheat control unit subjects the clearance do, the recording current projection distance protrusion value dw, and the heater projection sensitivity protrusion sensitivity e to temperature correction:

$do = do' + Kd \cdot \Delta T$ $dw = dw' + Kd \cdot \Delta T$ $e = e' + Ke \cdot \Delta T,$ wherein values denoted by ' are before correction, and then, calculates and distributes the preheat electric power Pp as $$Pp = \frac{do - dp}{e}; \text{ and}$$

the preheat control unit calculates and distributes the write heat electric power Pw as $$Pw = \frac{do - dp - dw}{e}.$$

15. The storage device according to claim 12, characterized in that the read clearance control unit has
a clearance information obtaining unit for obtaining a clearance do, a read target clearance dp, heater projection sensitivity protrusion sensitivity e, projection transition time tp, a first temperature compensation coefficient Kd, and a second temperature correction coefficient Ke corresponding to a target reading track from a system area of the recording medium; and
a read heat control unit for heating the heater by distributing read heat electric power to the heater from a frame position which is before the projection transition time tp with respect to a target frame and stopping electric power distribution to the heater at a next frame position after read is finished.

16. A control method of a storage device having a head having at least either one of a reading element and a recording element and provided with a heater for changing a projection distance protrusion value by thermal expansion accompanying electric-power-distributed heating for accessing data by floating above a rotating recording medium, the control method comprising:
a clearance information measurement step of measuring clearance information required for controlling a clearance between the reading or recording element and the recording medium upon desired correction; and
a clearance control step of controlling the clearance to a predetermined target clearance upon reproduction or recording by changing the projection distance protrusion value of the head by varying the electric power distributed to the heater,
wherein the recording medium is divided into a plurality of zones in a radial direction, and the clearance information measurement step includes measuring the clearance information for each of the zones and saving the information in the recording medium or a system area of a memory.

17. A computer-readable storage medium which stores a program characterized by causing a computer of a storage device having a head having at least either one of a reading element and a recording element and provided with a heater for changing a projection distance protrusion value by thermal expansion accompanying electric-power-distributed heating for accessing data by floating above a rotating recording medium to execute
a clearance information measurement step of measuring clearance information required for controlling a clearance between the reading or recording element and the recording medium upon desired correction; and
a clearance control step of controlling the clearance to a predetermined target clearance upon reproduction or recording by changing the projection distance protrusion value of the head by varying the electric power distributed to the heater,
wherein the recording medium is divided into a plurality of zones in a radial direction, and the clearance information measurement step includes measuring the clearance information for each of the zones and saving the information in the recording medium or a system area of a memory.

18. A control device of a storage device having a head having at least either one of a reading element and a recording element and provided with a heater for changing a projection distance protrusion value by thermal expansion accompanying electric-power-distributed heating for accessing data by floating above a rotating recording medium, the control device comprising:
a clearance information measurement unit for measuring clearance information required for controlling a clearance between the reading or recording element and the recording medium upon desired correction; and
a clearance control unit for controlling the clearance to a predetermined target clearance upon reproduction or recording by changing the projection distance protrusion value of the head by varying the amount of electric power distributed to the heater,
wherein the recording medium is divided into a plurality of zones in a radial direction, and the clearance information measurement unit measures the clearance information for each of the zones and saves the information in the recording medium or a system area of a memory.

* * * * *